(12) United States Patent
Wu et al.

(10) Patent No.: US 12,507,263 B2
(45) Date of Patent: Dec. 23, 2025

(54) TECHNIQUES FOR RESOURCE SELECTION FOR SIDELINK COMMUNICATION IN UNLICENSED RADIO FREQUENCY SPECTRUM BAND

(71) Applicant: QUALCOMM Incorporated, San Diego, CA (US)

(72) Inventors: Shuanshuan Wu, San Diego, CA (US); Arthur Gubeskys, San Diego, CA (US); Stelios Stefanatos, San Diego, CA (US); Shailesh Patil, San Diego, CA (US); Jing Sun, San Diego, CA (US); Xiaoxia Zhang, San Diego, CA (US); Tao Luo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 382 days.

(21) Appl. No.: 17/998,014

(22) PCT Filed: Jun. 21, 2021

(86) PCT No.: PCT/US2021/038200
§ 371 (c)(1),
(2) Date: Nov. 4, 2022

(87) PCT Pub. No.: WO2021/262577
PCT Pub. Date: Dec. 30, 2021

(65) Prior Publication Data
US 2023/0232431 A1    Jul. 20, 2023

(30) Foreign Application Priority Data
Jun. 22, 2020    (GR) ............................... 20200100353

(51) Int. Cl.
*H04W 72/40* (2023.01)
*H04W 16/14* (2009.01)
(Continued)

(52) U.S. Cl.
CPC ........... *H04W 72/40* (2023.01); *H04W 16/14* (2013.01); *H04W 72/02* (2013.01); *H04W 72/563* (2023.01)

(58) Field of Classification Search
None
See application file for complete search history.

(56) References Cited

U.S. PATENT DOCUMENTS 12,150,213 B2 * 11/2024 Xiong .................. H04L 27/2607
2017/0188391 A1    6/2017 Rajagopal et al.
(Continued)

FOREIGN PATENT DOCUMENTS

CN    110809904 A    2/2020
CN    111277973 A    6/2020
(Continued)

OTHER PUBLICATIONS

Interdigital Inc: "Resource Allocation for NR V2X", 3GPP Draft, 3GPP TSG RAN WG1 Meeting #94b, R1-1811115, (R16 V2X WI AI72414 Resource Allocation), 3rd Generation Partnership Project (3GPP), Mobile Competence Centre, 650, Route Des Lucioles, F-06921 Sophia-Antipolis Cedex, France, vol. RAN WG1, No. Chengdu, China, Oct. 8, 2018-Oct. 12, 2018, Sep. 29, 2018 (Sep. 29, 2018), XP051518518, 5 Pages, p. 3, section 3, p. 2, penultimate and last par, p. 2, text below "Proposal 2".
(Continued)

*Primary Examiner* — Kodzovi Acolatse
(74) *Attorney, Agent, or Firm* — Dalei Dong; Holland & Hart LLP

(57) ABSTRACT

Methods, systems, and devices for wireless communications are described. A user equipment (UE) may determine
(Continued)

resource selection priority levels associated with available resources for sidelink signaling in an unlicensed radio frequency spectrum band, the resources selection priority levels may be determined based on resource reservation information of the available resources, a time domain location of the available resources, or both. For example, a first resource of the available resources may be associated with a higher priority than a second resource of the available resources in resource selection. The UE may select one or more resources for the sidelink signaling from the available resources based on the resource selection priority levels associated with the available resources. The UE may transmit the sidelink signaling on the unlicensed radio frequency spectrum band using the one or more selected resources.

26 Claims, 13 Drawing Sheets

(51) Int. Cl.
  *H04W 72/02* (2009.01)
  *H04W 72/563* (2023.01)

(56) References Cited

U.S. PATENT DOCUMENTS

| | | | |
|---|---|---|---|
| 2017/0257876 A1* | 9/2017 | Loehr | H04W 28/0263 |
| 2020/0154440 A1* | 5/2020 | Gholmieh | H04W 4/40 |
| 2021/0105104 A1* | 4/2021 | Cao | H04L 1/1861 |
| 2021/0212026 A1* | 7/2021 | Peng | H04W 28/0268 |
| 2022/0022167 A1* | 1/2022 | Jha | H04W 72/02 |
| 2022/0124729 A1* | 4/2022 | Ji | H04L 1/1861 |
| 2022/0279536 A1* | 9/2022 | Khsiba | H04W 72/1263 |
| 2022/0377748 A1* | 11/2022 | He | H04W 4/70 |
| 2023/0081131 A1* | 3/2023 | Selvanesan | H04W 72/20 370/329 |

FOREIGN PATENT DOCUMENTS

| | | |
|---|---|---|
| EP | 3282618 A1 | 2/2018 |
| WO | WO-2019233563 A1 | 12/2019 |
| WO | WO-2020034588 A1 | 2/2020 |

OTHER PUBLICATIONS

International Search Report and Written Opinion—PCT/US2021/038200—ISA/EPO—Oct. 7, 2021.
Intel Corporation: "Design of Resource Allocation Mode-2 for NR V2X Sidelink Communication", 3GPP TSG RAN WG1 Meeting #99, R1-1912205, Reno, USA, Nov. 18-22, 2019, Nov. 9, 2019, pp. 1-32, the whole document.
Intel Corporation: "FL Summary#2 of Critical Issues for 7.2.4.2.2—V2X Mode 2", 3GPP TSG RAN WG1 Meeting #100-E, Draft R1-2001170, e-Meeting, Feb. 24, 2020-Mar. 6, 2020, 27 Pages, Feb. 22, 2020.
CATT: "Remaining Issues on Mode 2 Resource Allocation in NR V2X", 3GPP TSG RAN WG1 #100, R1-2000522, e-Meeting, Feb. 24, 2020-Mar. 6, 2020, 15 Pages.
Intel Corporation: "Remaining Opens of Resource Allocation Mode-2 for NR V2X Design", R1-2000731, 3rd Generation Partnership Project (3GPP), Mobile Competence Centre, 650, Route Des Lucioles, F-06921 Sophia-Antipolis Cedex, France, vol. Ran WG1, No. e-Meeting, Feb. 24, 2020-Mar. 6, 2020, Feb. 15, 2020, 16 Pages, XP051853424, The whole document.
OPPO: "Discussion on Remaining Open Issue for Mode 2", 3GPP TSG-RAN WG1 Meeting #100e, R1-2000493, e-Meeting, Feb. 24, 2020-Mar. 6, 2020, pp. 1-14.
Qualcomm Incorporated: "Sidelink Resource Allocation Mechanism for NR V2X", 3GPP TSG RAN WG1 Meeting #100-e, R1-2000963, Feb. 24, 2020-Mar. 6, 2020, 11 Pages.

\* cited by examiner

TECHNIQUES FOR RESOURCE SELECTION FOR SIDELINK COMMUNICATION IN UNLICENSED RADIO FREQUENCY SPECTRUM BAND

CROSS REFERENCES

The present Application is a 371 national stage filing of International PCT Application No. PCT/US2021/038200 by Wu et al. entitled "TECHNIQUES FOR RESOURCE SELECTION FOR SIDELINK COMMUNICATION IN UNLICENSED RADIO FREQUENCY SPECTRUM BAND," filed Jun. 21, 2021; and claims priority to Greek Provisional Patent Serial No 20200100353 by Wu, et al., entitled "TECHNIQUES FOR RESOURCE SELECTION FOR SIDELINK COMMUNICATION IN UNLICENSED RADIO FREQUENCY SPECTRUM BAND," filed Jun. 22, 2020, each of which is assigned to the assignee hereof, and each of which is expressly incorporated by reference in its entirety herein.

FIELD OF TECHNOLOGY

The following relates generally to wireless communications and more specifically to techniques for resource selection for sidelink communication in unlicensed radio frequency spectrum band.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may select a resource allocation for communications, such as sidelink communications. In some cases, a sidelink channel for the sidelink communications may be in an unlicensed radio frequency spectrum band. Some techniques for selecting resources in the unlicensed radio frequency spectrum band for sidelink communications can be improved.

SUMMARY

The described techniques relate to improved methods, systems, devices, and apparatuses that support techniques for resource selection for sidelink communication in an unlicensed radio frequency spectrum band. Generally, the described techniques provide for prioritizing some resources when selecting resources for sidelink communication to prevent transmission gaps. A user equipment (UE) may perform channel sensing and select resources for a sidelink transmission on a sidelink channel of an unlicensed radio frequency spectrum band. The UE may identify which resources are available for the sidelink transmission within a resource selection window and prioritize some resources to prevent a transmission gap occurring in a channel occupancy time (COT) acquired for the sidelink communication. If there is a transmission gap that is greater than a duration threshold in the COT, the UEs communicating on the sidelink channel may lose access to the channel medium or not acquire the channel medium in remaining slots of the COT, and the UEs may need to perform channel sensing to re-gain access to the channel, e.g., based on a channel access procedure with random back-off within a contention window. This may increase delay and overhead in channel access for sidelink UEs and degrade performance of other wireless devices that share the medium. In some cases, the UE may prioritize available resources which are in a slot that is not already at least partially reserved by another wireless device. For example, if there are available resources in slots which are completely unreserved, the UE may prioritize the available resources in the unreserved slots when selecting resources for the sidelink transmission. Additionally, or alternatively, the UE may prioritize available resources in earlier slots of the COT or resource selection window. For example, the UE may identify a high priority window earlier in the resource selection window, and available resources within the high priority window may be prioritized for selection over the other resources (e.g., later in the resource selection window).

A method of wireless communication at a UE is described. The method may include determining resource selection priority levels associated with available resources for sidelink signaling in an unlicensed radio frequency spectrum band, the resource selection priority levels may be determined based on resource reservation information of the available resources, a time domain location of the available resources, or both, where a first resource of the available resources is associated with a higher priority than a second resource of the available resources in resource selection, selecting one or more resources for the sidelink signaling from the available resources based on the resource selection priority levels associated with the available resources, and transmitting the sidelink signaling on the unlicensed radio frequency spectrum band using the one or more selected resources.

An apparatus for wireless communication at a UE is described. The apparatus may include a processor, memory coupled with the processor, and instructions stored in the memory. The instructions may be executable by the processor to cause the apparatus to determine resource selection priority levels associated with available resources for sidelink signaling in an unlicensed radio frequency spectrum band, the resource selection priority levels may be determined based on resource reservation information of the available resources, a time domain location of the available resources, or both, where a first resource of the available resources is associated with a higher priority than a second resource of the available resources in resource selection, select one or more resources for the sidelink signaling from the available resources based on the resource selection priority levels associated with the available resources, and transmit the sidelink signaling on the unlicensed radio frequency spectrum band using the one or more selected resources.

Another apparatus for wireless communication at a UE is described. The apparatus may include means for determining resource selection priority levels associated with available resources for sidelink signaling in an unlicensed radio frequency spectrum band, the resource selection priority levels may be determined based on resource reservation information of the available resources, a time domain location of the available resources, or both, where a first resource of the available resources is associated with a higher priority than a second resource of the available resources in resource selection, selecting one or more resources for the sidelink signaling from the available resources based on the resource selection priority levels associated with the available resources, and transmitting the sidelink signaling on the unlicensed radio frequency spectrum band using the one or more selected resources.

A non-transitory computer-readable medium storing code for wireless communication at a UE is described. The code may include instructions executable by a processor to determine resource selection priority levels associated with available resources for sidelink signaling in an unlicensed radio frequency spectrum band, the resource selection priority levels may be determined based on resource reservation information of the available resources, a time domain location of the available resources, or both, where a first resource of the available resources is associated with a higher priority than a second resource of the available resources in resource selection, select one or more resources for the sidelink signaling from the available resources based on the resource selection priority levels associated with the available resources, and transmit the sidelink signaling on the unlicensed radio frequency spectrum band using the one or more selected resources.

In some examples of the method, apparatuses, and non-transitory computer-readable medium described herein, determining the resource selection priority levels may include operations, features, means, or instructions for determining a first slot including the first resource may be unreserved for communications on the unlicensed radio frequency spectrum band, where the first resource may be associated with the higher priority based on the slot being unreserved, and determining a second slot including the second resource may be at least partially reserved by other devices for communications on the unlicensed radio frequency spectrum band.

In some examples of the method, apparatuses, and non-transitory computer-readable medium described herein, selecting the one or more resources may include operations, features, means, or instructions for randomly selecting the one or more resources from resources associated with the higher priority.

In some examples of the method, apparatuses, and non-transitory computer-readable medium described herein, selecting the one or more resources may include operations, features, means, or instructions for selecting the one or more resources for the sidelink signaling from the available resources, where resources associated with the higher priority may have a higher probability of being selected.

In some examples of the method, apparatuses, and non-transitory computer-readable medium described herein, selecting the one or more resources may include operations, features, means, or instructions for determining a first selection probability for resources associated with the higher priority, determining a second selection probability for resources associated with a lower priority, where the first selection probability may be greater than the second selection probability, and selecting the one or more resources from the available resources based on the first selection probability and the second selection probability.

In some examples of the method, apparatuses, and non-transitory computer-readable medium described herein, determining the resource selection priority levels may include operations, features, means, or instructions for identifying a resource selection window, where the available resources span the resource selection window, and identifying a high priority window within the resource selection window.

In some examples of the method, apparatuses, and non-transitory computer-readable medium described herein, the high priority window corresponds to earlier resources in the resource selection window.

In some examples of the method, apparatuses, and non-transitory computer-readable medium described herein, selecting the one or more resources may include operations, features, means, or instructions for determining a first selection probability for the resources associated with the higher priority in the high priority window, determining a second selection for to resources associated with a lower priority, where the first selection probability may be greater than the second selection probability, and selecting the one or more resources from the available resources based on the first selection probability and the second selection probability.

In some examples of the method, apparatuses, and non-transitory computer-readable medium described herein, selecting the one or more resources may include operations, features, means, or instructions for selecting the one or more resources from resources in the high priority window.

In some examples of the method, apparatuses, and non-transitory computer-readable medium described herein, the selecting may be random.

In some examples of the method, apparatuses, and non-transitory computer-readable medium described herein, the high priority window may be based on a processing speed of the UE.

Some examples of the method, apparatuses, and non-transitory computer-readable medium described herein may further include operations, features, means, or instructions for determining slots including resources associated with the higher priority may be not reserved by other wireless devices for the unlicensed radio frequency spectrum band.

Some examples of the method, apparatuses, and non-transitory computer-readable medium described herein may further include operations, features, means, or instructions for determining a resource selection window corresponding to the available resources, where the resource selection window may be determined based on a channel occupancy time configured by the UE, a base station, another UE, a roadside unit, or any combination thereof.

In some examples of the method, apparatuses, and non-transitory computer-readable medium described herein, the resource selection priority levels include at least a first priority level and a second priority level, where a resource may be associated with the first priority level or the second priority level based on whether a slot including the resource may be at least partially reserved by another device, a time location of the resource within a resource selection window, or a combination thereof.

In some examples of the method, apparatuses, and non-transitory computer-readable medium described herein, the resource may be associated with the first priority level if the slot including the resource may be not at least partially reserved by the other device or if the resource may be early within the resource selection window, or both.

In some examples of the method, apparatuses, and non-transitory computer-readable medium described herein, the resource may be associated with the second priority level if the slot including the resource may be at least partially reserved by the other device or if the resource may be later within the resource selection window, or both.

In some examples of the method, apparatuses, and non-transitory computer-readable medium described herein, the sidelink signaling includes a sidelink transmission and one or more retransmissions of the sidelink transmission, where the one or more resources may be selected for the sidelink transmission and the one or more retransmissions of the sidelink transmission.

In some examples of the method, apparatuses, and non-transitory computer-readable medium described herein, a first set resources for the sidelink transmission may be selected based on a high priority window earlier within a resource selection window, and a second set of resources for the one or more retransmissions of the sidelink transmission may be selected based on slots including the second set of resources not being at least partially reserved by other wireless devices for the unlicensed radio frequency spectrum band.

In some examples of the method, apparatuses, and non-transitory computer-readable medium described herein, the available resources may be within a channel occupancy time configured by a base station, the UE, or another node.

In some examples of the method, apparatuses, and non-transitory computer-readable medium described herein, the available resources span at least a channel occupancy time configured by a base station, the UE, or another node.

DETAILED DESCRIPTION

Figure 1:
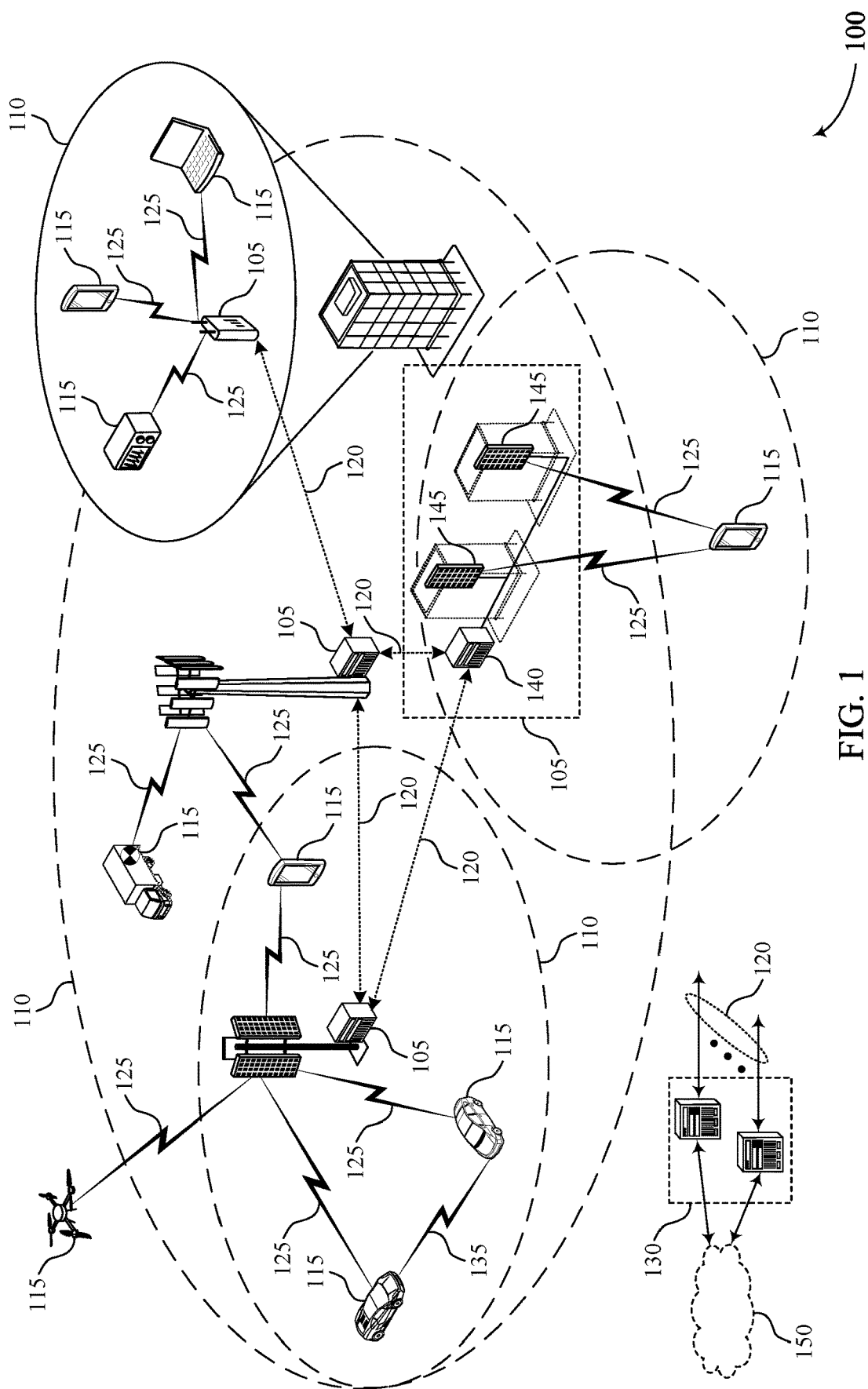
FIG. 1 illustrates an example of a system for wireless communications that supports techniques for resource selection for sidelink communication in unlicensed radio frequency spectrum band in accordance with aspects of the present disclosure.

Some wireless communications systems may support direct communications between devices. For example, user equipment (UEs) may communicate on a sidelink. In some of these systems, a UE may autonomously select resources for communications over the sidelink. For example, the UE may perform sensing to detect resource availability and select from candidate resources for a sidelink transmission. By decoding signals in a past sensing window, the UE may determine which resources in a selection window (e.g., a future window) are available, e.g., the resources that have not been reserved by other devices. The UE may determine available resources in the selection window based on decoding sidelink control information (SCI), measuring reference signals of transmissions in the sensing window, or both, which may indicate resource reservations in the resource selection window. In some cases, the UE may reserve a first resource for a sidelink transmission and a number of additional resources in future slots for other transmissions or retransmissions.

Some wireless communications systems may support sidelink communications and unlicensed radio frequency spectrum communications. In some cases, an unlicensed radio frequency spectrum band may be shared by multiple technologies (e.g., Wi-Fi, New Radio (NR)), and devices may operate according some conditions to use the unlicensed radio frequency spectrum band. For example, a device may perform a listen-before-talk (LBT) type channel access procedure to sense whether the channel is free (e.g., not used by other devices) to obtain the channel medium and communicate. In some cases, if there is a transmission gap that is greater than a duration threshold (e.g., 16 microseconds, 25 microseconds) that occurs in a channel occupancy after obtaining the channel medium, the devices that are sharing the channel occupancy may not assume that the medium is still available after the gap. Therefore, if a transmission gap occurs in a shared channel occupancy after obtaining the channel medium, the devices sharing the channel occupancy may lose the channel medium. If the devices lose the channel medium, the devices may perform another LBT type channel access procedure (e.g., a category 4 LBT, or a type 1 channel access as defined in 3GPP) before resuming transmission, which increase channel access delay and overhead, and thus degrade system performance.

In some cases, to support sidelink communications using unlicensed spectrum, UEs may share a set of resources. For example, a device such as a base station, a network node, or a UE, may initiate or configure a channel occupancy time (COT) for the channel medium, and UEs may share the unlicensed radio frequency spectrum band during the COT. In some cases, the UEs may use autonomous scheduling techniques to identify available resources and randomly select resources for sidelink transmissions and retransmissions. However, implementation based on existing techniques to schedule resources may result in gaps in the autonomously scheduled resources (e.g., within a COT). If the gap is greater than a duration threshold (e.g., 16 us or 25 us), the UEs sharing the channel occupancy may lose the medium. For example, based on random resource selection, it is highly probable that some slots within a resource selection window or COT may not have resources that are selected or reserved by UEs sharing the channel occupancy, these slots will thus have no sidelink transmissions from the UEs, which create gaps in the shared channel occupancy. The UE may perform another LBT (e.g., category 4 LBT or type 1 channel access as defined in 3GPP) and determine the medium is available before resuming transmission after the transmission gap. This may increase latency and reduce reliability for sidelink communications on an unlicensed radio frequency spectrum band.

A UE implementing techniques described herein may allocate resources to reduce the probability of occurrences of a gap between sidelink transmissions within a COT. These techniques may increase the probability that the UE, and the other UEs sharing the COT, can keep the channel medium after obtaining the medium and avoid performing additional LBTs to reacquire the medium. The UE may identify available resources within a resource selection window or a shared channel occupancy and determine different priorities for the available resources within the resource selection window or channel occupancy. In some cases, resources in slots which have no resources been currently reserved by other devices or UEs may be prioritized for selection. For example, by selecting resources in slots which are not already at least partially used by other devices, the UE may reduce the number of transmission gaps during the COT by reducing the number of slots without transmission. In some examples, the UE may prioritize selecting resources in slots which are earlier in the resource selection window. Selecting a resource which is earlier in the resource selection window may increase the likelihood of the UE successfully obtaining the channel medium and sending the sidelink signaling. One or more of these techniques may be applied to reserve resources for sidelink communications. For example, the UE may prioritize selecting earlier resources for a current transmission and prioritize selecting resources in slots with no reserved resources for future retransmissions. When performing resource selection, a resource in a resource selection window or channel occupancy may be identified as available if no other devices have already reserved the resource, if the resource has been reserved, but the measured reference signal received power (RSRP) from the UE that are reserving the resource is smaller than an RSRP threshold, if, although the resource has been reserved, the UE that are reserving the resource has lower traffic priority, or any combination thereof. Therefore, a slot that has no resource being currently reserved by other UEs is such a slot that all resources in the slot are identified as available.

Aspects of the disclosure are initially described in the context of wireless communications systems. Aspects of the disclosure are further illustrated by and described with reference to apparatus diagrams, system diagrams, and flowcharts that relate to techniques for resource selection for sidelink communication in unlicensed radio frequency spectrum band.

FIG. 1 illustrates an example of a wireless communications system 100 that supports techniques for resource selection for sidelink communication in unlicensed radio frequency spectrum band in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Techniques implemented by the wireless communications system 100 may provide for prioritizing resources when selecting resources for sidelink communication. In some cases, the wireless communications system 100 may support sidelink communications, such as for V2X systems. In some cases, cellular V2X communications, including or in addition to sidelink communications, may be deployed in unlicensed spectrum. However, unlicensed spectrum may be utilized by other technologies as well, such as Wi-Fi, and unlicensed spectrum use may be subject to some regulatory conditions. For example, a UE 115 may perform LBT (e.g., Type 1 or Type 2 channel access) prior to communicating, and the UE 115 may transmit if the channel is determined to be available. Additionally, in some cases, a COT of the channel in time may not exceed a pre-configured amount of time (e.g., which may be regulatory for the unlicensed radio frequency spectrum).

The wireless communications system 100 may support autonomous resource allocation. For example, a UE 115 may perform channel sensing and select resources for a sidelink transmission on a sidelink channel of an unlicensed radio frequency spectrum band. The UE 115 may decode control information, such as SCI, to determine which of the upcoming resources are available and which are reserved. The UE may also perform RSRP measurement from UEs 115 reserving resources to determine whether the RSRP projected to a reserved resource is smaller than an RSRP threshold. The UE may identify a resource as available if no other devices have already reserved the resource, or if the resource has been reserved, but the measured RSRP from the UE that are reserving the resource is smaller than the RSRP threshold, or both.

The UE 115 may identify which resources are available for the sidelink transmission within a resource selection window and prioritize some resources to prevent a transmission gap occurring in a COT shared by UEs, including the UE 115. If a slot within the gap has no sidelink transmission from UEs sharing the COT, the slot may create a transmission gap in the COT, and the UEs sharing the COT, including the UE 115, may lose access to the channel medium or not acquire the channel medium. For example, the unlicensed radio frequency spectrum band may be shared by other technologies (e.g., Wi-Fi). If the transmission gap is greater than a duration threshold (e.g., 16 us or 25 us), the UEs may need to perform an LBT type channel access again to regain access to the medium. In some cases, the UE 115 may prioritize available resources which are in a slot where no resource has been already at least partially reserved by another device. For example, if there are available resources in a slot which is completely unreserved (i.e., all resources in the slot are identified as available), the UE 115 may prioritize the resources in the slot when selecting resources for the sidelink transmission. Additionally, or alternatively, the UE 115 may prioritize available resources in earlier slots of the COT or resource selection window. For example, the UE 115 may identify a high priority window earlier in the resource selection window, and available resources within the high priority window may be prioritized for selection over the other resources (e.g., later in the resource selection window).

Figure 2:
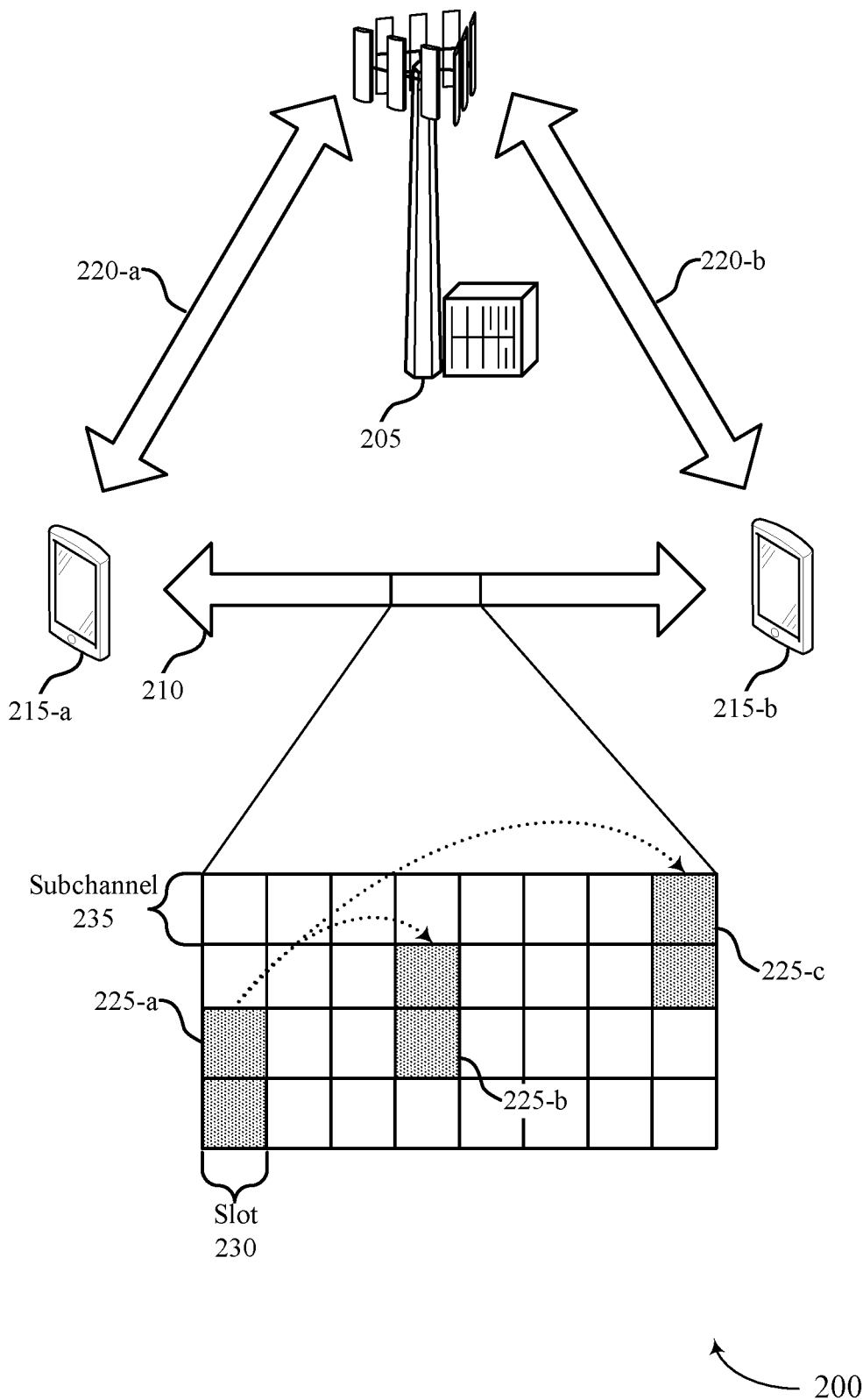
FIG. 2 illustrates an example of a wireless communications system that supports techniques for resource selection for sidelink communication in unlicensed radio frequency spectrum band in accordance with aspects of the present disclosure.

FIG. 2 illustrates an example of a wireless communications system 200 that supports techniques for resource selection for sidelink communication in unlicensed radio frequency spectrum band in accordance with aspects of the present disclosure. In some examples, the wireless communications system 200 may implement aspects of wireless communications system 100. The wireless communications system 200 may include UE 215-*a* and UE 215-*b*, which may be examples of a UE 115 described with reference to FIG. 1. The wireless communications system 200 may include base station 205, which may be an example of a base station 105 described with reference to FIG. 1.

Base station 205 may communicate with UE 215-*a* and UE 215-*b* over communication links 220. For example, base station 205 may communicate with UE 215-*a* over communication link 220-*a* and may communicate with UE 215-*b* over communication link 220-*b*. The wireless communications system 200 may also support sidelink communications. For example, UE 215-*a* and UE 215-*b* may communicate with each other over a sidelink 210. In some examples, the wireless communications system 200 may support D2D or V2X communications, which may utilize the sidelink 210 for communications between devices. For example, in some cases, a UE 215 may be an example of a vehicle UE (V-UE) or a pedestrian UE (P-UE).

In some cases, the wireless communications system 200 may support autonomous resource allocation on the sidelink 210. For example, a UE 215 may identify candidate resources for sidelink transmissions based on sensing, and the UE 215 may select resources for transmission on the sidelink 210 from the candidate resources. The UE 215 may select a resource 225 for a current transmission (e.g., resource 225-*a*) and reserve a number of additional future resources (e.g., resources 225-*b* and 225-*c*), which may be used for additional packets or a re-transmission of a packet. A resource may correspond to, for example, one or more slots 230 and one or more subchannels 235; each subchannel may include a number of contiguous (or non-contiguous, e.g., interlaced) RBs.

To identify available resources, a UE 215 may monitor and decode all transmissions on the unlicensed radio frequency spectrum band. In some cases, the UE 215 may measure an RSRP for each decoding. When the UE 215 has a packet to transmit, the UE 215 may determine a sensing window (e.g., a time-frequency window in the past on the unlicensed radio frequency spectrum band) and determine available resources in a future selection window based on control information decoding and RSRP measurement in the sensing window. For example, control information (e.g., SCI) received in the sensing window may indicate reserved resources in the selection window. In some cases, the measured RSRP may be projected to corresponding future resources, for example if the resource is reserved. The RSRP projections in the selection window may indicate whether a resource is available. For example, the resource may be available if the resource is not reserved or if the resource is reserved, but the RSRP measurement is smaller than an RSRP threshold.

The UE 215 may the identify which resources in a selection window are available and which resources are reserved. The UE 215 may reserve a resource for a sidelink transmission and reserve a number of additional resources for additional transmissions (e.g., retransmissions) from the available resources. For example, UE 215-a may reserve resource 225-a for a sidelink transmission, and UE 215-a may reserve resource 225-b and resource 225-c for potential retransmissions of the sidelink transmission. In some wireless communications systems, a UE 115 may randomly select from the available resources. For example, in some wireless communications systems, each available resource may have an equal probability to be selected.

In some cases, the wireless communications system 200 may support communications on unlicensed radio frequency spectrum bands. In some cases, communications on the sidelink 210 may use an unlicensed radio frequency spectrum band. Some systems may implement sidelink communications using licensed spectrum, such as sharing spectrum in a licensed cellular band or using dedicated spectrum for an intelligent transport system (ITS). In some examples, the wireless communications system 200 may implement aspects of these systems while supporting sidelink communications using unlicensed spectrum.

Unlicensed radio frequency spectrum may be shared by multiple technologies. For example, an unlicensed radio frequency spectrum band may be utilized by New Radio communications and Wi-Fi, among others. In some cases, to ensure fair utilization of the unlicensed radio frequency spectrum band, devices may be subject to some regulatory conditions. For example, a device may perform an LBT procedure to determine whether the channel medium is available before transmitting. If the channel is sensed to be free (e.g., energy measured in the channel is below a threshold for energy-detection based channel sensing), then the device may access the channel medium and transmit. In some examples, the channel sensing may wait for a random back-off before the device can access the channel. In some cases, the device may occupy the channel for a configured amount of time. For example, the device may obtain the channel for a COT, and a maximum duration for a COT may be configured for the device or for wireless communications system 200.

In some cases, UEs 215 may share a set of resources on an unlicensed radio frequency spectrum band for sidelink communications. In some cases, the set of resources may be resources in a COT. The COT may span multiple slots and include one or more resource blocks in frequency. The COT may be initiated by a UE 215, the base station 205, or another network node. For example, the UE 215, the base station 205, or a roadside unit in V2X systems may initiate a COT based on passing an LBT procedure.

In some examples, transmission from a device may be limited to a number of slots in a COT. For example, a UE 215 may be supported to transmit one packet or transport block at a time in a COT. In some cases, each transmission (e.g., including retransmissions) may be limited to a number of slots in the COT. In some examples, UEs 215 may be supported to transmit multiple packets or transport blocks within a COT, with or without retransmissions. In some cases, a COT may be shared by multiple UEs 215. For example, another UE 215 may share the COT initiated by the UE 215.

In some cases, when sidelink transmissions from UEs 215 sharing the COT are discontinuous, the UEs 215 may lose the channel. For example, UE 215-a may transmit on the sidelink 210 using resource 225-a, resource 225-b, and resource 225-c. There may be two slots 230 between the resources 225, which may result in a transmission gap if no other UEs 215 sharing the COT transmit in the two slots. If there is no transmission during these slots, other devices may sense the channel to be available during the transmission gap and access the medium. For example, UEs sharing the COT including UE 215-a could lose the channel medium between resource 225-a and resource 225-b. In some cases, a UE 215 may assume the channel is lost after a transmission gap of a configured duration (e.g., even if the channel is still available). The UE 215 may then perform LBT again to resume transmission after the transmission gap. This may increase latency for sidelink communications and decrease reliability.

To improve reliability and decrease latency for sidelink communications, a UE 115, such as a UE 215, may implement techniques to reduce the probability of a transmission gap in a COT. For example, a UE 215 may perform resource selection by prioritizing some resources for a sidelink transmission to reduce the probability a transmission gap. By implementing these techniques, the UEs 215 sharing the COT may keep the channel medium after the COT has been initiated and avoiding performing additional LBTs to reacquire the channel medium.

In some examples, a UE 215 may identify available resources within a resource selection window and prioritize some resources when selecting resources for sidelink transmission. For example, the UE 215 may identify and assign priority levels to the available resources, such that some of the available resources may be prioritized for selection over others. For example, a first set of resources may be prioritized over a second set of resources. In some cases, the UE 215 may select from the first set of resources (e.g., and not from the second set of resources) when scheduling a sidelink transmission. For example, the UE 215 may randomly select from the first set of resources, where the first set of resources may include resources which decrease the likelihood of a transmission gap or the UEs 215 losing control of the channel medium.

In some cases, the UE 215 may select from both the first set of resources and the second set of resources, but a resource in the first set of resources may have a higher likelihood of being selected. For example, the UE 215 may assign different selection probabilities to resources in the first group and resources in the second group, such that a resource in the first set has higher probability than a resource in the second set, and the UE 215 may select resources for sidelink transmissions in accordance with the selection probabilities. In some cases, the UE 215 may assign different weighting factors to the first group and the second group when determining the resource selection probability. For example, with different resource selection probabilities, it may still be possible to select a resource from the second group, but it may be more likely to select a resource from the first group. These techniques may be implemented for selecting a resource for a current transmission or for selecting one or more additional resources for additional transmissions (e.g., resources for retransmissions of the current transmission).

In some examples, resources which are in slots that have no resources which have already been reserved may be prioritized for selection. For example, a slot which does not have any portion (e.g., subchannels, resource blocks, or subcarriers) of the resource already reserved may be prioritized. If a slot includes some available resources, but other subcarriers of the slot have already been reserved by another device, the slot may not be prioritized for selection. By prioritizing resources in slots which have not been at least partially reserved, transmission gaps (e.g., or the duration of transmission gaps) created by slots with no resources been reserved may be reduced or eliminated within a shared COT, which may increase a likelihood of the UEs 215 sharing the COT maintaining the channel medium and prevent the UE 215 from performing an additional LBT.

For example, a UE 215 performing resource selection may group available resources in a COT or selection window to at least two groups. The first group may include resources that are from slots which do not have reserved resources. For example, all resources within those slots on the unlicensed radio frequency spectrum band may be identified as available. A second group may include available resources from slots which have some reserved resources. For example, the UE 215 may have identified available resources in a slot, and the slot may have some resources reserved by another device. In some cases of the first example, the UE 215 may select resources for a sidelink transmission from the first group. For example, the UE 215 may select resources from slots which are not partially reserved, and the UE 215 may not select resources from slots which are partially reserved. In some cases of the first example, the UE 215 may select from the first group or the second group, but resources from the first group may have a higher probability to be selected.

In some examples, available resources in an earlier slot of the COT or resource selection window may be prioritized for selection. For example, a UE 215 may determine a sub-selection window, or a high priority window, within the resource selection window. Available resources within the sub-selection window may be prioritized for selection over resources outside of the sub-selection window. In some cases, the sub-selection window may be a subset of the COT or selection window (e.g., the duration may be smaller than a duration of the COT or selection window). A starting location of the sub-selection window may be determined based on a processing speed of the UE 215. For example, the starting location may be based on a UE packet arrival and ready timeline. For example, if the UE 215 has a packet ready for transmission in slot n, the sub-selection window may start from slot n+1. In another example, if the UE 215 identifies that the first slot with available resources is slot n+k, the sub-selection window may begin from slot n+k+1. The UE 215 may select resources from the sub-selection window for a sidelink transmission.

In some cases, the selection from the sub-selection window may be random. In some examples, resources in slots which are not at least partially reserved and are earlier in the COT or selection window may be prioritized for selection. For example, in some cases, the UE 215 may weight resources in slots which are not partially reserved based on earliness within the selection window.

In some examples, a UE 215 may select a resource from available resources based on a location of a slot carrying the resource, whether the slot carrying the resource is at least partially reserved, or both. For example, the UE 215 may select earlier available resources for a resource for a current transmission and select resources for future transmissions based on which slots are unreserved.

Figure 3:
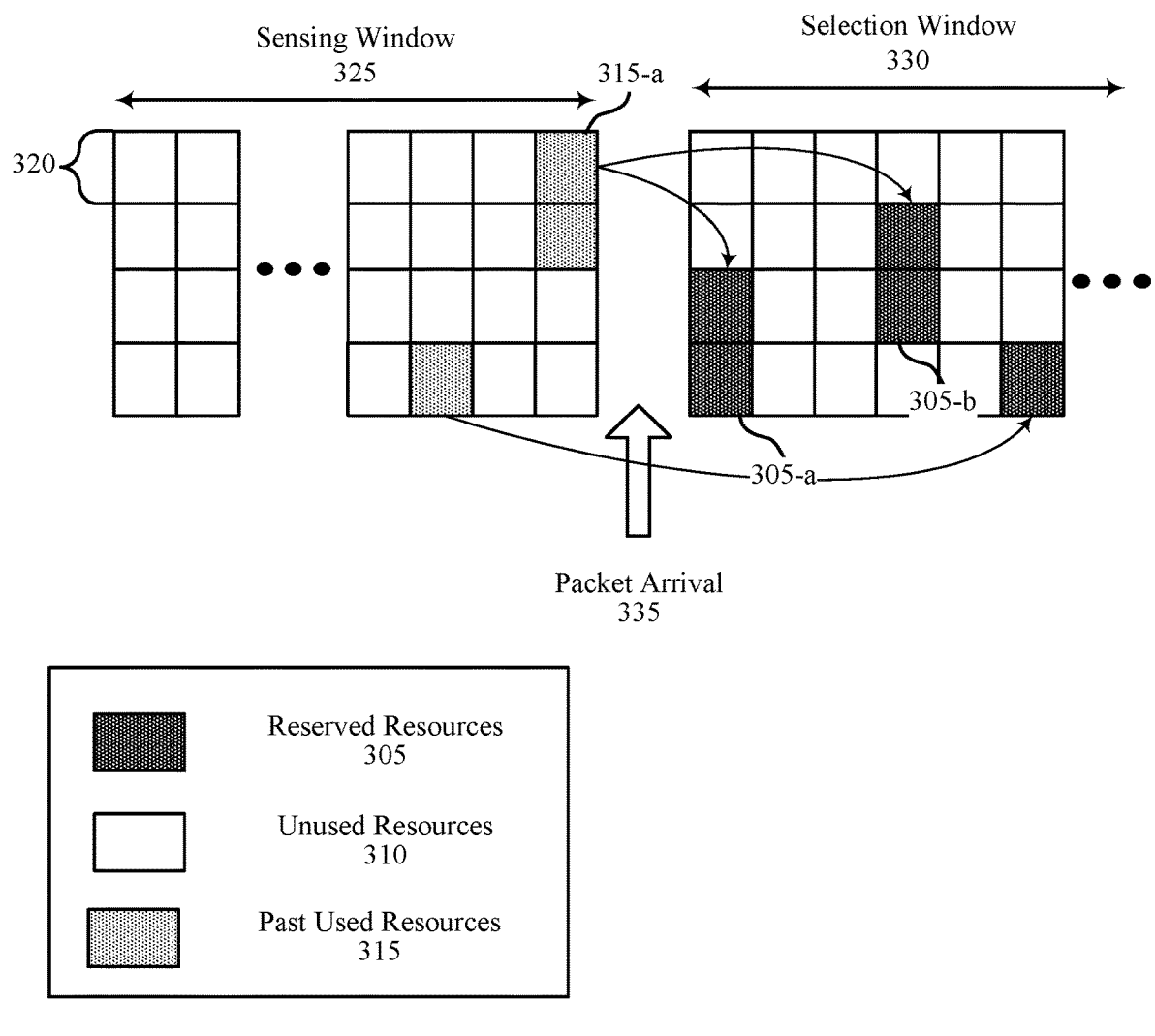
FIG. 3 illustrates an example of an autonomous resource selection scheme that supports techniques for resource selection for sidelink communication in unlicensed radio frequency spectrum band in accordance with aspects of the present disclosure.

FIG. 3 illustrates an example of an autonomous resource selection scheme 300 that supports techniques for resource selection for sidelink communication in unlicensed radio frequency spectrum band in accordance with aspects of the present disclosure. In some examples, the autonomous resource selection scheme 300 may implement aspects of wireless communications system 100.

As described with reference to FIG. 2, a UE 115 may implement the autonomous resource selection scheme 300 to select available resources on a channel of an unlicensed radio frequency spectrum band for sidelink communications during a COT. The channel may include one or more resource blocks in frequency or one or more sub-channels 320. In some cases, multiple resource blocks may form a sub-channel 320. The COT may span one or more slots. For example, the COT may span twenty slots. The COT may be initiated by the UE 115, a base station 105, or another wireless node. For example, the wireless node may be another UE 115, a roadside unit, a transmission reception point, etc.

The UE 115 may perform channel sensing and access the wireless communications channel based on the sensing outcomes. For example, the UE 115 may identify the available resources, or candidate resources, for a sidelink transmission and select resources for the sidelink transmission from the candidate resources. For example, the candidate resources may include the unused resources 310. By performing the sensing, the UE 115 may identify reserved resources 305, which may be reserved by other UEs 115 sharing the COT; the remaining resource within the resource selection window may be identified as candidate resources for resource selection To perform the channel sensing and identify the available resources, the UE 115 may monitor and decode incoming transmissions. For example, the UE 115 may monitor and decode all transmissions on the channel. In some cases, the UE 115 may perform RSRP measurements for each of the decodings. When resource selection has been triggered or a packet arrives for transmission for the UE 115 (e.g., the UE 115 has a packet to transmit) at 335, the UE 115 may determine a sensing window 325. The sensing window 325 may be a window in the past, corresponding to previously received and decoded signaling. The UE 115 may determine available resources based on control information (e.g., SCI) decoding and RSRP measurements in the sensing window. The UE 115 may identify the available resources in a resource selection window 330 (e.g., a window in the future) by projecting the decoding and measurement outcomes from the sensing window 325 (e.g., from transmissions on past used resources 315) to the resource selection window 330. To identify the available resources, the SCI decoding may indicate whether a resource in the resource selection window 330 has been reserved (e.g., corresponding a reserved resource 305). The measured RSRP may be projected to corresponding future reserved resources 305. The UE 115 may determine if the resource is available based on if the resource is not reserved, or if the resource is reserved, but the projected RSRP is smaller than an RSRP threshold. The RSRP threshold may, in some cases, be configured by a base station 105, pre-configured at the UE, or determined by the UE.

The UE 115 may select an initial resource and reserve a number of additional resources. For example, the UE 115 may select a first resource for an initial transmission and select additional resources for future transmissions. The additional resources may be used for transmissions of different packets or re-transmission of the packet sent using the first resource. In an example, a first UE 115 may have selected resource 315-*a*, resource 305-*a*, and resource 305-*b* for a transmission. The first UE 115 may indicate, in control information of a transmission at resource 315-*a*, that resource 305-*a* and resource 305-*b* are reserved. A second UE 115 performing channel sensing at 335 may decode the control information from resource 315-*a* in the sensing window 325 and determine that resource 305-*a* and resource 305-*b* are reserved in the resource selection window 330. Therefore, the second UE 115 may identify available resources in the selection window based on performing the channel sensing on the sensing window 325.

In some wireless communications systems, the UE 115 may randomly select resources from the available resources. However, this may lead to transmission gaps for the UE 115, which may cause UEs 115 sharing the COT to lose the channel medium. UEs 115 described herein may implement techniques to prioritize the available resources. For example, a UE 115 may prioritize resources in slots which are unreserved or prioritize resources in slots that occur earlier in the resource selection window. A UE 115 described herein may select resources according to the prioritization to decrease the likelihood of a transmission gap occurring in the COT, such as by selecting resources between the reserved resources. Selecting resources based on a prioritization scheme may improve reliability and reduce latency for sidelink communications on an unlicensed radio frequency spectrum band. Some examples for prioritizing resources for selection are described with reference to FIG. 4.

Figure 4:
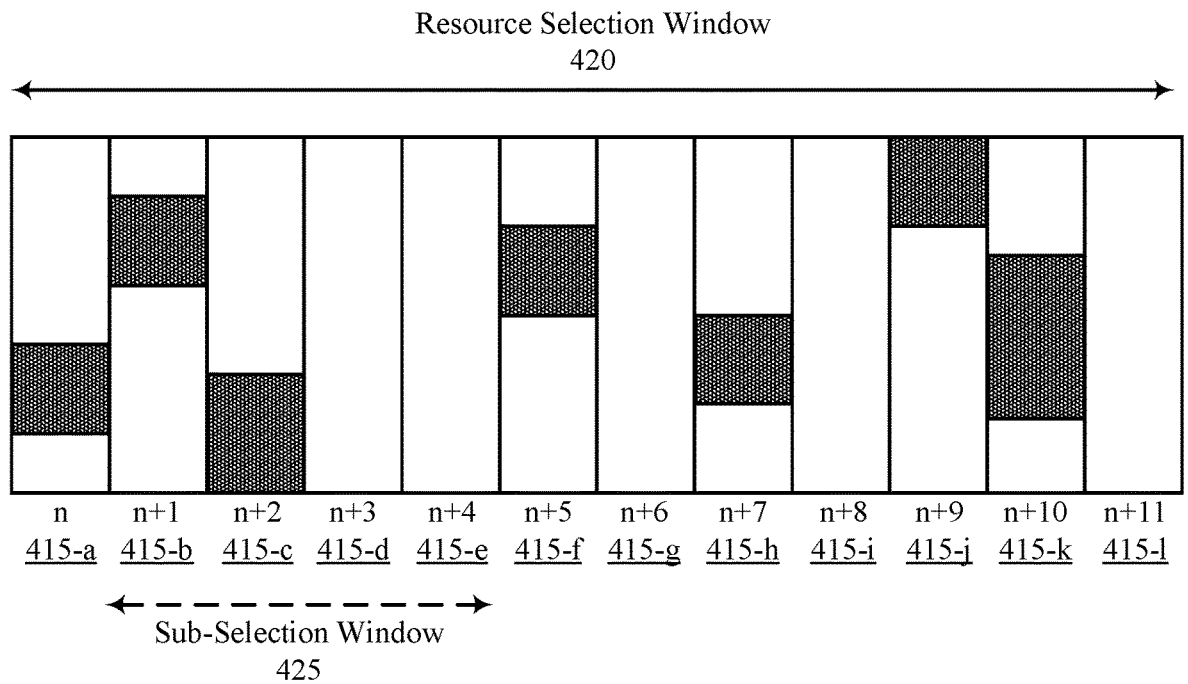
FIG. 4 illustrates an example of a resource selection scheme that supports techniques for resource selection for sidelink communication in unlicensed radio frequency spectrum band in accordance with aspects of the present disclosure.
Figure 4:
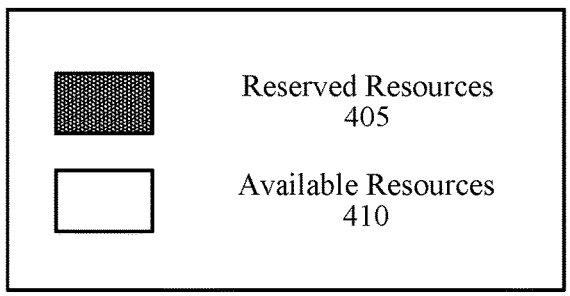

FIG. 4 illustrates an example of a resource selection scheme 400 that supports techniques for resource selection for sidelink communication in unlicensed radio frequency spectrum band in accordance with aspects of the present disclosure. In some examples, the resource selection scheme 400 may implement aspects of wireless communications system 100.

A UE 115 may select resources on a channel of an unlicensed radio frequency spectrum band. The UE 115 may select the resources within a resource selection window 420 of a COT. The UE 115 may identify reserved resources 405 and available resources 410 within the resource selection window 420. The reserved resources 405 may be sensed to be reserved by other UEs 115 sharing the COT, where one or multiple resources from the available resources 410 may be selected by the UE 115 for a sidelink transmission. The resource selection window 420 may span a number of slots (e.g., slot 415-*a* through at least slot 415-*l*), and the wireless channel may include one or more resource blocks in frequency. In some cases, the resource selection window 420 may be equal to or smaller (e.g., in time) than a COT. In some cases, the selection window may extend beyond the end of the COT.

The UE 115 may reserve a first resource allocation of the available resources 410 for a sidelink transmission and a number of additional available resource allocations for additional sidelink transmissions (e.g., re-transmissions). In some wireless communications systems, the UE 115 may select the resource allocations randomly of the available resources 410. A UE 115 described herein may implement techniques to prioritize the available resources 410 and select based on the prioritization. Prioritizing the available resources 410 may reduce a likelihood of a transmission gap occurring, which may cause the UE 115 and other UEs 115 sharing the COT to lose the transmission medium.

In a first example, available resources 410 in slots 415 without any reserved resources 405 may be prioritized for selection. For example, slot 415-*a*, slots 415-*b*, slot 415-*c*, slot 415-*f*, slot 415-*h*, slot 415-*j*, and slot 415-*k* may each have reserved resources 405 and available resources 410. Slot 415-*d*, slot 415-*e*, slot 415-*g*, slot 415-*i*, and slot 415-*l* may not have any reserved resources 405, except available resources 410. The UE 115 may prioritize the available resources 410 in the slots 415 without any at least partial reservation, where the available resources 410 in the slots 415-*d*, 415-*e*, 415-*g*, 415-*i*, and 415-*l* are prioritized for selection.

In some cases, the UE 115 may group the available resources 410. For example, a first group may include available resources 410 from slots 415 without any reserved resources 405 (e.g., slot 415-*d*, slot 415-*e*, slot 415-*g*, slot 415-*i*, and slot 415-*l*) and a second group may include the available resources 410 in slots 415 which are at least partially reserved (e.g., slot 415-*a*, slots 415-*b*, slot 415-*c*, slot 415-*f*, slot 415-*h*, slot 415-*j*, and slot 415-*k*). In some cases, the UE 115 may select resources for a sidelink transmission from the first group. That is, the UE 115 may select from the available resources 410 in slots 415 that have no reserved resources 405 first. If the first group is non-empty (e.g., there is at least one slot where no resource has been reserved), the UE 115 may select resources from the first group. In some cases, the UE 115 may randomly select from the first group. For example, when selecting resource within the first group, each resource within the group may have an equal probability to be selected. If the first group is empty, the UE 115 may select a resource from the second group.

In some cases, the UE 115 may select from all available resources 410 within the COT or resource selection window 420, but some resources may have a higher probability of being selected. For example, when selecting resources for sidelink transmissions, an available resource 410 in the first group may have a higher probability to be selected than the available resources 410 in the second group. For example, a first selection probability or weighting factor may be applied to the first group, and a second selection probability or weighting factor that is smaller than the first selection probability may be applied to the second group. In some cases, the first selection probability may be greater than 1 and the second selection probability may be less than one.

As an example of biased resource selection, there may be N resources in the first group and M resources in the second group. Therefore, there may be M+N available resources 410 for selection. In random resource selection, each resource may have an equal probability of $$\frac{1}{M+N}$$

to be selected. In biased resource selection, to determine resource selection probability, weight factors $W_A$ and $W_B$ may be applied to the first group and second group respectively, where $W_A \neq W_B$, and $W_A > 1 > W_B$. An available resource 410 in the first group may have the probability of $$\frac{W_A}{M+N}$$

of being selected, where an available resource 410 in the second group may have the probability of $$\frac{W_B}{M+N}$$

of being selected. In some cases, the weight factors may be selected to satisfy that $$\frac{W_A}{M+N}*N+\frac{W_B}{M+N}*M=1.$$

In a second example, the UE 115 may prioritize the available resources 410 that are in an earlier slot 415 of the COT or the resource selection window 420. For example, the UE 115 may determine a sub-selection window 425, or a high priority window. The available resources 410 within the sub-selection window 425 may be prioritized for resource selection. For example, the UE 115 may select resources from the available resources 410 within the sub-selection window 425. In some cases, the UE 115 may randomly select resources from the available resources 410 within the sub-selection window 425. The sub-selection window 425 may be a subset of the COT or the resource selection window 420. For example, the duration of the sub-selection window 425 may be smaller than the COT or the duration of the resource selection window 420.

In some examples, the UE 115 may select both from the available resources 410 within the sub-selection window 425 and resources outside of the sub-selection window 425, but the available resources 410 within the sub-selection window 425 may be prioritized. For example, as described above, a first group may include the available resources 410 within the sub-selection window 425, and a second group may include the available resources 410 outside of the sub-selection window 425. In some cases, the first group may include available resources 410 that are earlier in the COT or selection window than the available resources 410 in the second group. In some cases, the UE 115 may apply a first selection probability to the first group (e.g., a weighting factor $W_A$ as described above) and a second selection probability to the second group (e.g., the weighting factor $W_B$ as described above).

In some cases, a starting location of the sub-selection window may be based on a packet arrival timeline or packet ready timeline of the UE 115. In some cases, these timelines may be based on a UE processing speed. For example, if the UE 115 has a packet ready for transmission in slot n (e.g., slot 415-a), the sub-selection window 425 may start from slot n+1 (e.g., slot 415-b). In another example, the UE 115 may identify that the first slot 415 with available resources 410 is slot n+k, so the sub-selection window may start from slot n+k+1.

The UE 115 may prioritize available resources 410 based on being early in the resource selection window 420, being included in a slot 415 without any reserved resources 405, or both. For example, available resources 410 in slots 415 that have no reserved resources 405 and that are also earlier in the COT or resource selection window 420 may be prioritized for selection. In some cases, a first group may include available resources 410 which are both in slots 415 without reserved resources 405 and that are within the sub-selection window 425. The UE 115 may either select from the first group or apply selection probabilities to the first group and a second group including the remaining available resources 410.

In some cases, the UE 115 may prioritize resources different based on whether the UE 115 is selecting a resource for a current transmission or a future transmission. For example, the UE 115 may prioritize an available resource 410 in earlier slots 415 for a current transmission, and the UE 115 may prioritize available resources 410 in slots 415 without reserved resources 405 for future transmissions. In some cases, the future transmissions may include retransmissions of the current transmission.

Figure 5:
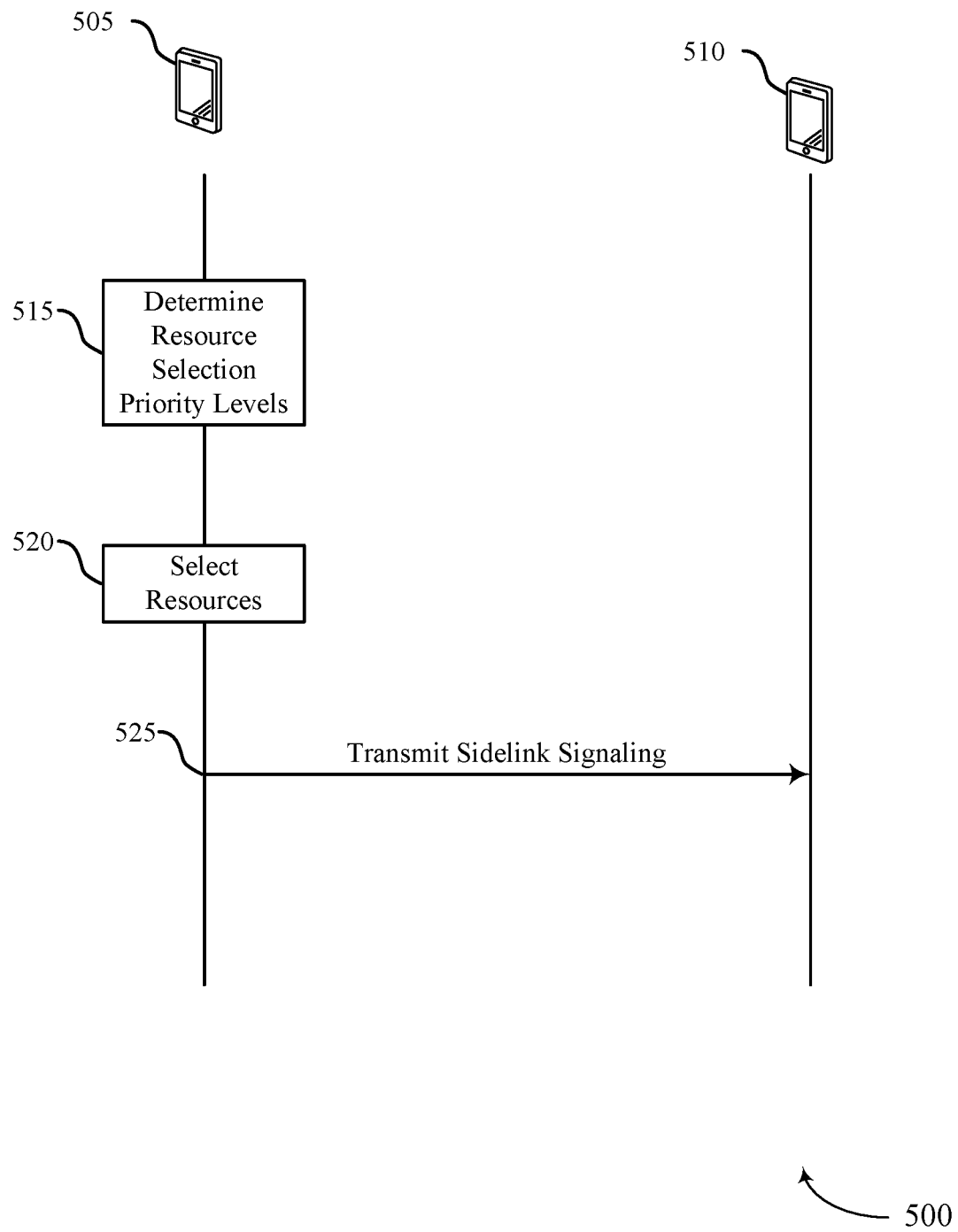
FIG. 5 illustrates an example of a process flow that supports techniques for resource selection for sidelink communication in unlicensed radio frequency spectrum band in accordance with aspects of the present disclosure.

FIG. 5 illustrates an example of a process flow 500 that supports techniques for resource selection for sidelink communication in unlicensed radio frequency spectrum band in accordance with aspects of the present disclosure. In some examples, the process flow 500 may implement or may be implemented by aspects of wireless communications system 100 or 200. The process flow 500 may be performed by a UE 505 or a UE 510, or both, which may be examples of a base station 105 or a UE 115 described with reference to FIGS. 1 and 2. In some examples, a UE 505 or a UE 510 may be an example of a pedestrian UE or a vehicle UE in a V2X system.

The UE 505 and the UE 510 may communicate over a sidelink. The UE 505 and the UE 510 may support autonomous resources selection for communications over the sidelink. The communications over the sidelink may be on an unlicensed radio frequency spectrum band. The process flow 500 may support techniques for prioritizing resources to reduce the likelihood of a transmission gap after selecting resources for the sidelink communications.

At 515, UE 505 may determine resource selection priority levels for the available resources. For example, the UE 505 may determine the resource selection priority levels associated with available resources for sidelink signaling in an unlicensed radio frequency spectrum band, the resource selection priority levels may be determined based on resource reservation information of the available resources, a time domain location of the available resources, or both. For example, a first resource of the available resources may be associated with a higher priority than a second resource of the available resources in resource selection. In some examples, the UE 505 may perform channel sensing as described in more detail with reference to FIG. 3.

In some cases, the UE 505 may determine a first slot including the first resource is unreserved for communications on the unlicensed radio frequency spectrum band, where the first resource is associated with the higher priority based on the slot being unreserved. The UE 505 may determine a second slot including the second resource is at least partially reserved by other devices (e.g., other UEs 115 sharing the COT) for communications on the unlicensed radio frequency spectrum band. For example, available resources in slots which are not at least partially reserved may be prioritized for resource selection.

In some examples, the UE 505 may determine resource selection priority levels based on a sub-selection window or high priority window. For example, the UE 505 may identify a resource selection window, where the available resources span the resource selection window, and the UE 505 may identify a high priority window within the resource selection window. In some cases, the high priority window may correspond to earlier resources in the resource selection window.

At 520, the UE 505 may select one or more resources for the sidelink signaling from the available resources based on the resource selection priority levels associated with the available resources. For example, the UE 505 may select the one or more resources based on the one or more resources corresponding to slots which are unreserved by other wireless devices. In some cases, the UE 505 may select the one or more resources based on the one or more resources being within the high priority window. In some examples, the UE 505 may determine, or assign, a first selection probability to resources associated with the higher priority and a second selection probability to resources associated with a lower priority. The higher selection probability may increase a likelihood that a higher priority resource is selected (e.g., randomly selected) for the sidelink communication.

At 525, the UE 505 may transmit the sidelink signaling to the UE 510. In some cases, the UE 505 may perform an LBT procedure to gain access to the transmission medium and send the sidelink signaling. The resource selection techniques described herein may increase a likelihood that the UE 505 can obtain access to the channel medium to send the sidelink transmission. In some cases, the techniques described herein may further increase a likelihood that the UE 505, and other UEs 505 sharing the COT, retain the channel medium for future sidelink transmissions or retransmissions.

Figure 6:
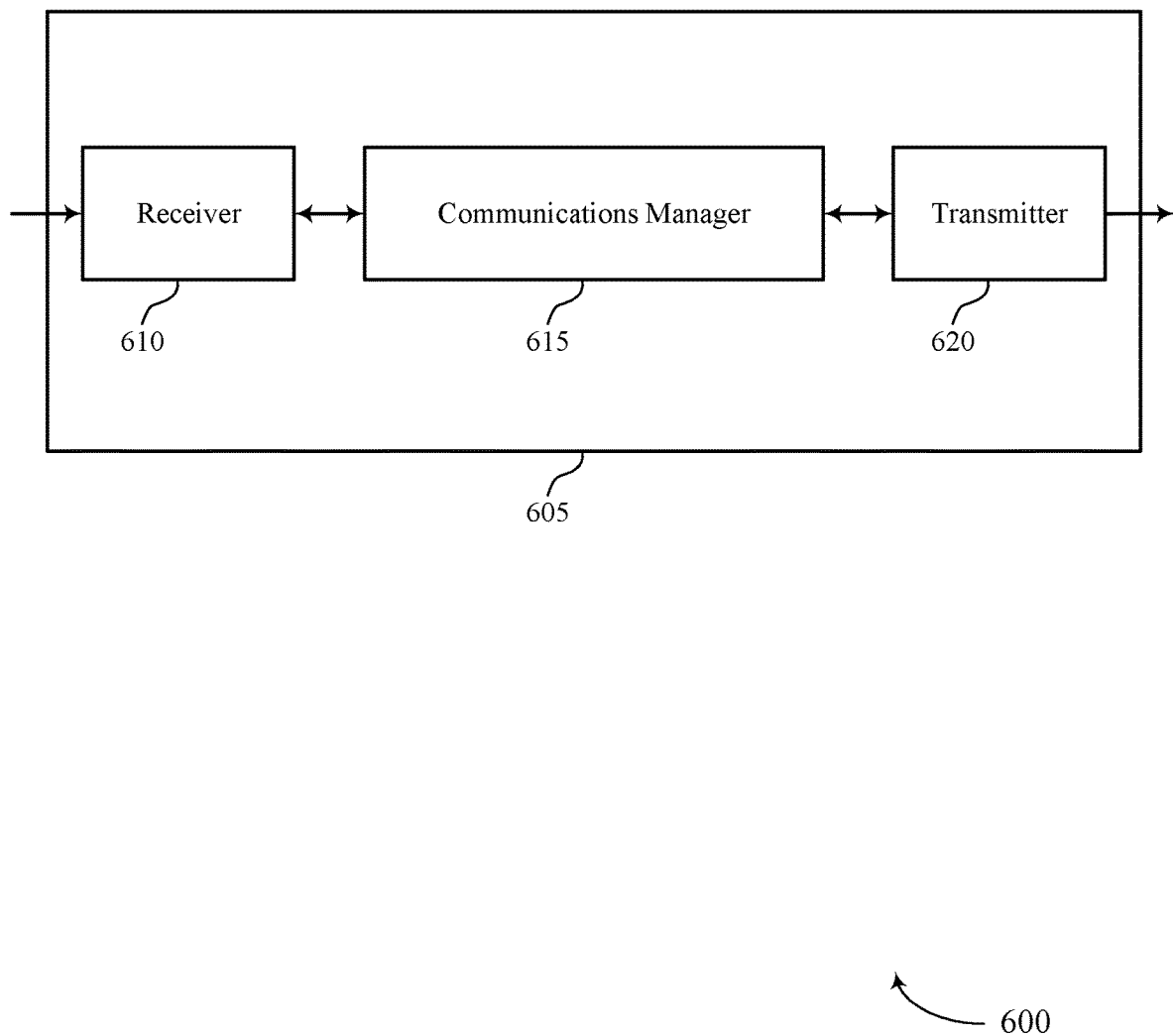
FIGS. 6 and 7 show block diagrams of devices that support techniques for resource selection for sidelink communication in unlicensed radio frequency spectrum band in accordance with aspects of the present disclosure.

FIG. 6 shows a block diagram 600 of a device 605 that supports techniques for resource selection for sidelink communication in unlicensed radio frequency spectrum band in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to techniques for resource selection for sidelink communication in unlicensed radio frequency spectrum band). Information may be passed on to other components of the device 605. The receiver 610 may be an example of aspects of the transceiver 920 described with reference to FIG. 9. The receiver 610 may utilize a single antenna or a set of antennas.

The communications manager 615 may determine resource selection priority levels associated with available resources for sidelink signaling in an unlicensed radio frequency spectrum band, the resource selection priority levels may be determined based on resource reservation information of the available resources, a time domain location of the available resources, or both, where a first resource of the available resources is associated with a higher priority than a second resource of the available resources in resource selection, select one or more resources for the sidelink signaling from the available resources based on the resource selection priority levels associated with the available resources, and transmit the sidelink signaling on the unlicensed radio frequency spectrum band using the one or more selected resources. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the UE communications manager 615 as described herein may be implemented to realize one or more potential advantages. One example may allow a UE 115 to decrease latency and improve reliability by reserving resources in a COT to reduce a likelihood of losing a channel medium on an unlicensed radio frequency spectrum band. By selecting resources to reduce a likelihood of a transmission gap in the COT, the UE 115, and other UEs 115 sharing the COT, may be less likely to lose the channel medium to another wireless device or assume the channel medium is unavailable due to a transmission gap. Additionally, or alternatively, these techniques may improve reliability for other wireless communications devices occupying the unlicensed radio frequency spectrum band.

The transmitter 620 may transmit signals generated by other components of the device 605. In some examples, the transmitter 620 may be collocated with a receiver 610 in a transceiver. For example, the transmitter 620 may be an example of aspects of the transceiver 920 described with reference to FIG. 9. The transmitter 620 may utilize a single antenna or a set of antennas.

By including or configuring the communications manager 615 in accordance with examples as described herein, the device 605 (e.g., a processor controlling or otherwise coupled to the receiver 610, the transmitter 620, the communications manager 615, or a combination thereof) may support techniques for reduced processing, more efficient utilization of communication resources, among other enhancements.

Figure 7:
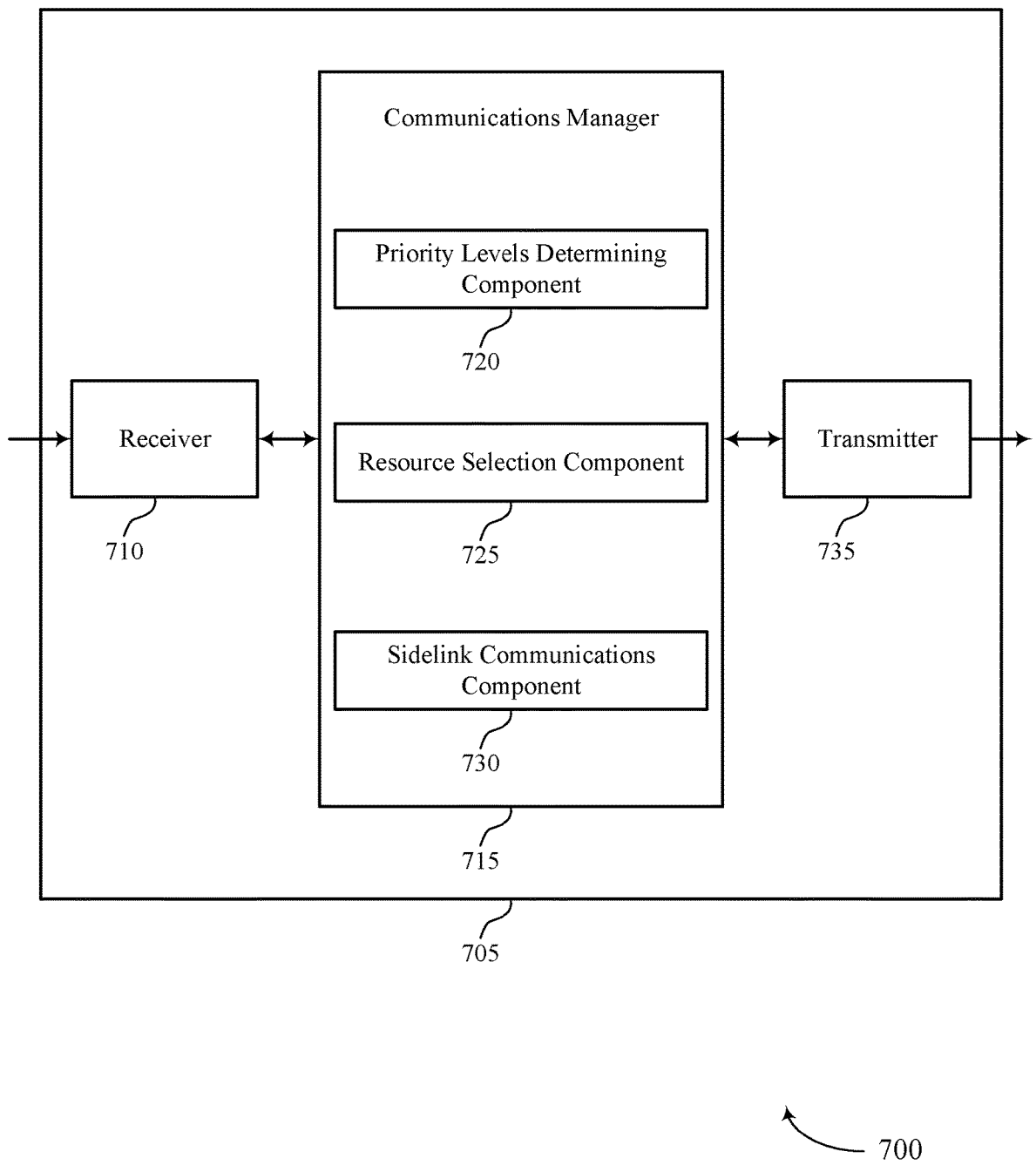

FIG. 7 shows a block diagram 700 of a device 705 that supports techniques for resource selection for sidelink communication in unlicensed radio frequency spectrum band in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to techniques for resource selection for sidelink communication in unlicensed radio frequency spectrum band). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a priority levels determining component 720, a resource selection component 725, and a sidelink communications component 730. The communications manager 715 may be an example of aspects of the communications manager 910 described herein.

The priority levels determining component 720 may determine resource selection priority levels associated with available resources for sidelink signaling in an unlicensed radio frequency spectrum band, the resource selection priority levels may be determined based on resource reservation information of the available resources, a time domain location of the available resources, or both, where a first resource of the available resources is associated with a higher priority than a second resource of the available resources in resource selection.

The resource selection component 725 may select one or more resources for the sidelink signaling from the available resources based on the resource selection priority levels associated with the available resources.

The sidelink communications component 730 may transmit the sidelink signaling on the unlicensed radio frequency spectrum band using the one or more selected resources.

The transmitter 735 may transmit signals generated by other components of the device 705. In some examples, the transmitter 735 may be collocated with a receiver 710 in a transceiver. For example, the transmitter 735 may be an example of aspects of the transceiver 920 described with reference to FIG. 9. The transmitter 735 may utilize a single antenna or a set of antennas.

Figure 8:
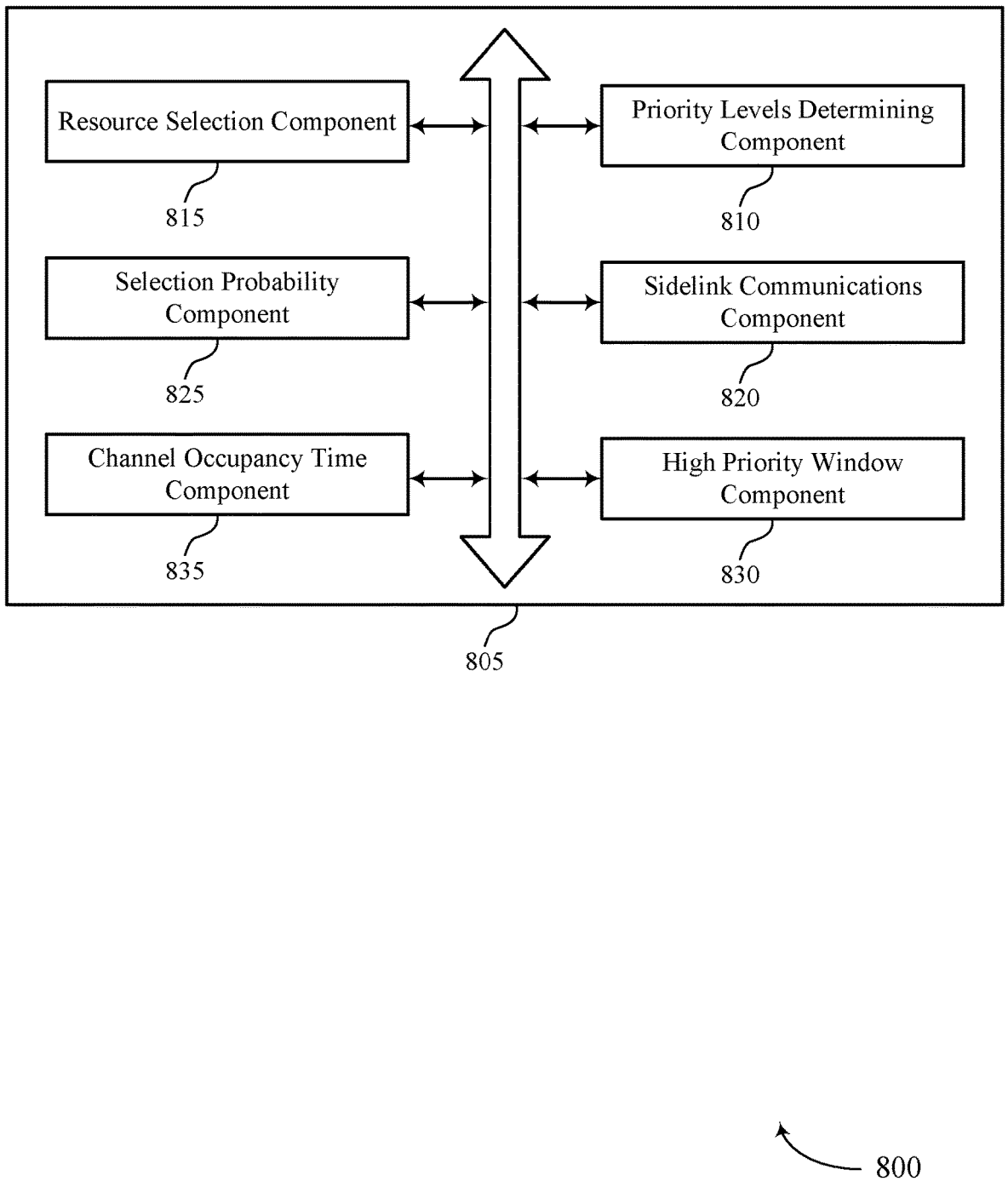
FIG. 8 shows a block diagram of a communications manager that supports techniques for resource selection for sidelink communication in unlicensed radio frequency spectrum band in accordance with aspects of the present disclosure.

FIG. 8 shows a block diagram 800 of a communications manager 805 that supports techniques for resource selection for sidelink communication in unlicensed radio frequency spectrum band in accordance with aspects of the present disclosure. The communications manager 805 may be an example of aspects of a communications manager 615, a communications manager 715, or a communications manager 910 described herein. The communications manager 805 may include a priority levels determining component 810, a resource selection component 815, a sidelink communications component 820, a selection probability component 825, a high priority window component 830, and a channel occupancy time component 835. Each of these components may communicate, directly or indirectly, with one another (e.g., via one or more buses).

The priority levels determining component 810 may determine resource selection priority levels associated with available resources for sidelink signaling in an unlicensed radio frequency spectrum band, the resource selection priority levels may be determined based on resource reservation information of the available resources, a time domain location of the available resources, or both, where a first resource of the available resources is associated with a higher priority than a second resource of the available resources in resource selection.

In some examples, the priority levels determining component 810 may determine a first slot including the first resource is unreserved for communications on the unlicensed radio frequency spectrum band, where the first resource is associated with the higher priority based on the slot being unreserved. In some examples, the priority levels determining component 810 may determine a second slot including the second resource is at least partially reserved by other devices for communications on the unlicensed radio frequency spectrum band.

In some cases, the resource selection priority levels include at least a first priority level and a second priority level, where a resource is associated with the first priority level or the second priority level based on whether a slot including the resource is at least partially reserved by another device, a time location of the resource within a resource selection window, or a combination thereof. In some cases, the resource is associated with the first priority level if the slot including the resource is not at least partially reserved by the other device or if the resource is early within the resource selection window, or both. In some cases, the resource is associated with the second priority level if the slot including the resource is at least partially reserved by the other device or if the resource is later within the resource selection window, or both.

The resource selection component 815 may select one or more resources for the sidelink signaling from the available resources based on the resource selection priority levels associated with the available resources. In some examples, the resource selection component 815 may randomly select the one or more resources from resources associated with the higher priority. In some examples, the resource selection component 815 may select the one or more resources for the sidelink signaling from the available resources, where resources associated with the higher priority have a higher probability of being selected.

The sidelink communications component 820 may transmit the sidelink signaling on the unlicensed radio frequency spectrum band using the one or more selected resources. In some cases, the sidelink signaling includes a sidelink transmission and one or more retransmissions of the sidelink transmission, where the one or more resources are selected for the sidelink transmission and the one or more retransmissions of the sidelink transmission. In some cases, a first set resources for the sidelink transmission are selected based on a high priority window earlier within a resource selection window, and a second set of resources for the one or more retransmissions of the sidelink transmission are selected based on slots including the second set of resources not being at least partially reserved by other wireless devices for the unlicensed radio frequency spectrum band.

The selection probability component 825 may determine a first selection probability for resources associated with the higher priority. In some examples, the selection probability component 825 may determine a second selection probability for resources associated with a lower priority, where the first selection probability is greater than the second selection probability. In some examples, the selection probability component 825 may select the one or more resources from the available resources based on the first selection probability and the second selection probability.

The high priority window component 830 may identify a resource selection window, where the available resources span the resource selection window. In some examples, the high priority window component 830 may identify a high priority window within the resource selection window.

In some examples, the high priority window component 830 may determine a first selection probability for the resources associated with the higher priority in the high priority window. In some examples, the high priority window component 830 may determine a second selection for to resources associated with a lower priority, where the first selection probability is greater than the second selection probability.

In some examples, the high priority window component 830 may select the one or more resources from the available resources based on the first selection probability and the second selection probability. In some examples, the high priority window component 830 may select the one or more resources from resources in the high priority window.

In some examples, the high priority window component 830 may determine slots including resources associated with the higher priority are not reserved by other wireless devices for the unlicensed radio frequency spectrum band. In some cases, the high priority window corresponds to earlier resources in the resource selection window. In some cases, the selecting is random. In some cases, the high priority window is based on a processing speed of the UE.

The channel occupancy time component 835 may determine a resource selection window corresponding to the available resources, where the resource selection window is determined based on a channel occupancy time configured by the UE, a base station, another UE, a roadside unit, or any combination thereof. In some cases, the available resources are within a channel occupancy time configured by a base station, the UE, or another node. In some cases, the available resources span at least a channel occupancy time configured by a base station, the UE, or another node.

Figure 9:
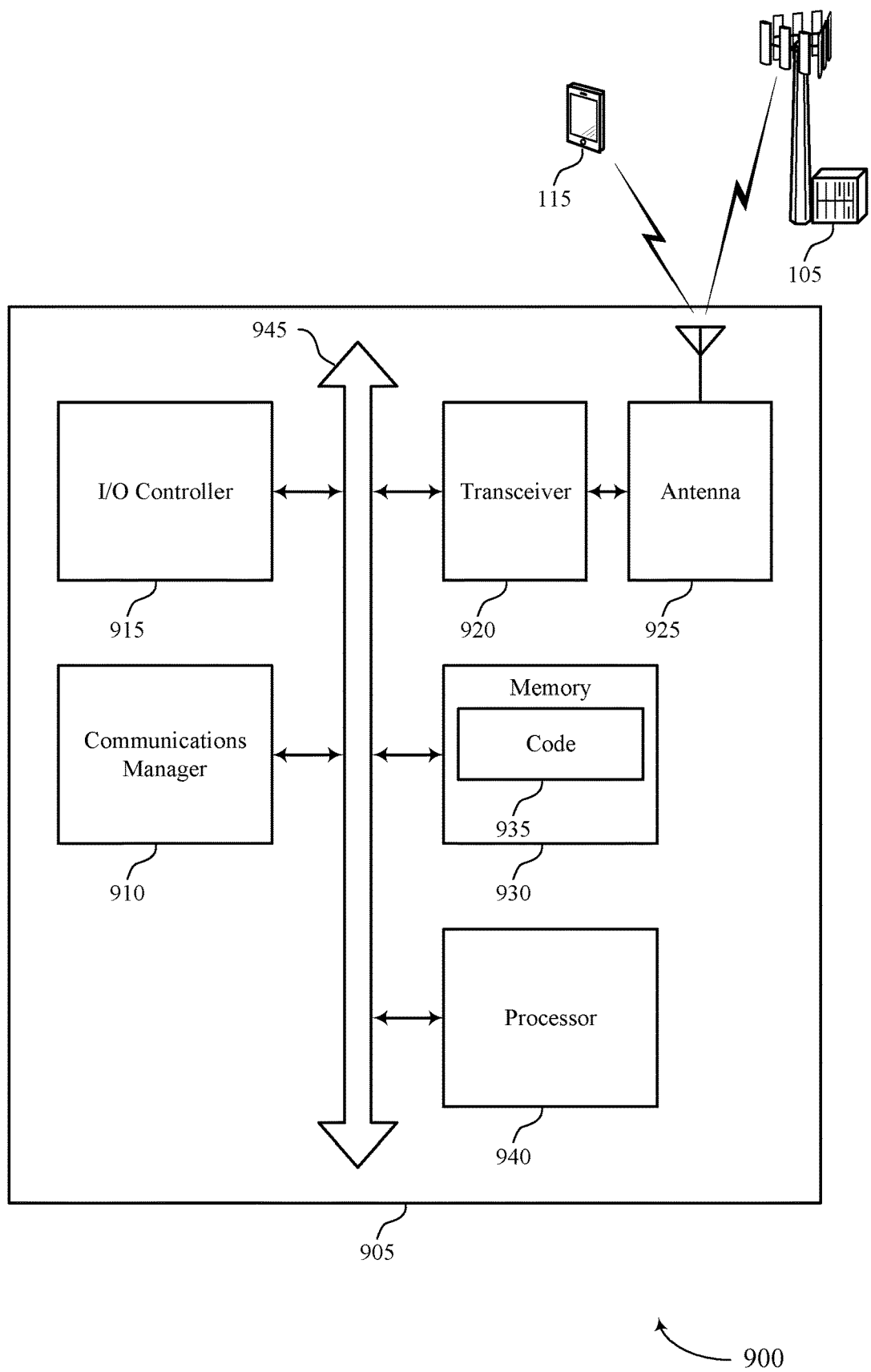
FIG. 9 shows a diagram of a system including a device that supports techniques for resource selection for sidelink communication in unlicensed radio frequency spectrum band in accordance with aspects of the present disclosure.

FIG. 9 shows a diagram of a system 900 including a device 905 that supports techniques for resource selection for sidelink communication in unlicensed radio frequency spectrum band in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may determine resource selection priority levels associated with available resources for sidelink signaling in an unlicensed radio frequency spectrum band, the resource selection priority levels may be determined based on resource reservation information of the available resources, a time domain location of the available resources, or both, where a first resource of the available resources is associated with a higher priority than a second resource of the available resources in resource selection, select one or more resources for the sidelink signaling from the available resources based on the resource selection priority levels associated with the available resources, and transmit the sidelink signaling on the unlicensed radio frequency spectrum band using the one or more selected resources.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for resource selection for sidelink communication in unlicensed radio frequency spectrum band).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

By including or configuring the communications manager 910 in accordance with examples as described herein, the device 905 may support techniques for improved communication reliability, reduced latency, and more efficient utilization of communication resources, among other enhancements.

Figure 10:
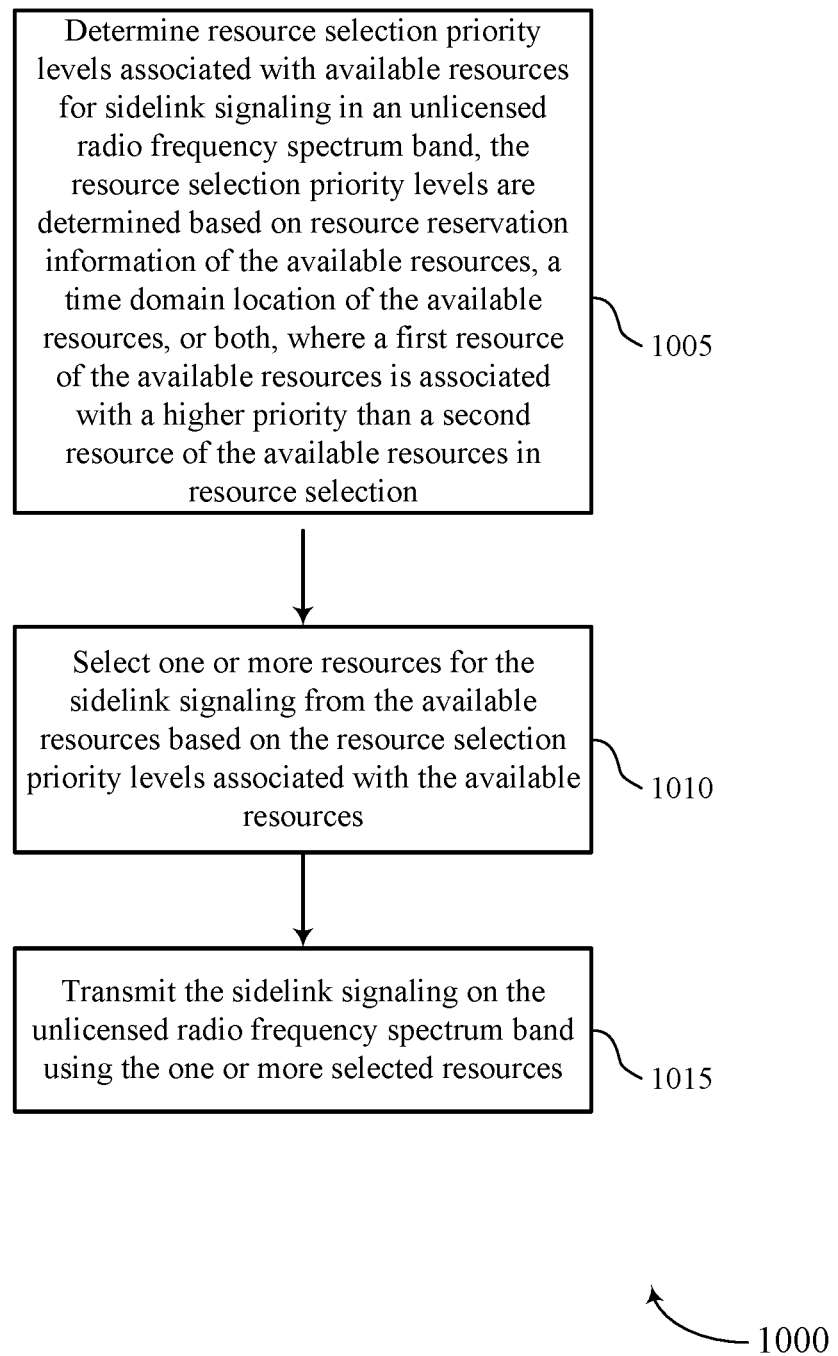
FIGS. 10 through 13 show flowcharts illustrating methods that support techniques for resource selection for sidelink communication in unlicensed radio frequency spectrum band in accordance with aspects of the present disclosure.

FIG. 10 shows a flowchart illustrating a method 1000 that supports techniques for resource selection for sidelink communication in unlicensed radio frequency spectrum band in accordance with aspects of the present disclosure. The operations of method 1000 may be implemented by a UE 115 or its components as described herein. For example, the operations of method 1000 may be performed by a communications manager as described with reference to FIGS. 6 through 9. In some examples, a UE may execute a set of instructions to control the functional elements of the UE to perform the functions described below. Additionally, or alternatively, a UE may perform aspects of the functions described below using special-purpose hardware.

At 1005, the UE may determine resource selection priority levels associated with available resources for sidelink signaling in an unlicensed radio frequency spectrum band, the resource selection priority levels may be determined based on resource reservation information of the available resources, a time domain location of the available resources, or both, where a first resource of the available resources is associated with a higher priority than a second resource of the available resources in resource selection. The operations of 1005 may be performed according to the methods described herein. In some examples, aspects of the operations of 1005 may be performed by a priority levels determining component as described with reference to FIGS. 6 through 9.

At 1010, the UE may select one or more resources for the sidelink signaling from the available resources based on the resource selection priority levels associated with the available resources. The operations of 1010 may be performed according to the methods described herein. In some examples, aspects of the operations of 1010 may be performed by a resource selection component as described with reference to FIGS. 6 through 9.

At 1015, the UE may transmit the sidelink signaling on the unlicensed radio frequency spectrum band using the one or more selected resources. The operations of 1015 may be performed according to the methods described herein. In some examples, aspects of the operations of 1015 may be performed by a sidelink communications component as described with reference to FIGS. 6 through 9.

Figure 11:
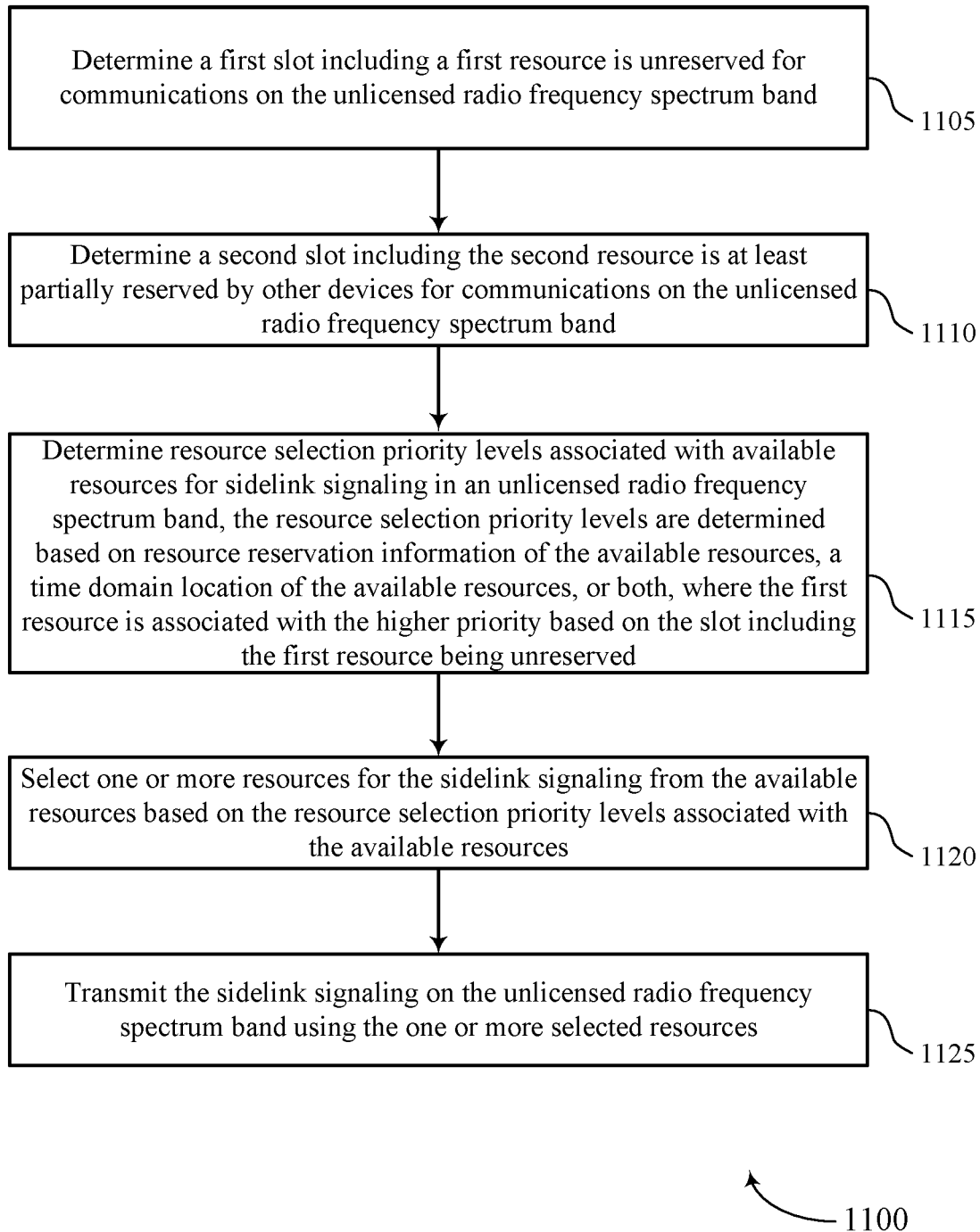

FIG. 11 shows a flowchart illustrating a method 1100 that supports techniques for resource selection for sidelink communication in unlicensed radio frequency spectrum band in accordance with aspects of the present disclosure. The operations of method 1100 may be implemented by a UE 115 or its components as described herein. For example, the operations of method 1100 may be performed by a communications manager as described with reference to FIGS. 6 through 9. In some examples, a UE may execute a set of instructions to control the functional elements of the UE to perform the functions described below. Additionally, or alternatively, a UE may perform aspects of the functions described below using special-purpose hardware.

At 1105, the UE may determine a first slot including a first resource is unreserved for communications on the unlicensed radio frequency spectrum band. The operations of 1105 may be performed according to the methods described herein. In some examples, aspects of the operations of 1105 may be performed by a priority levels determining component as described with reference to FIGS. 6 through 9.

At 1110, the UE may determine a second slot including the second resource is at least partially reserved by other devices for communications on the unlicensed radio frequency spectrum band. The operations of 1110 may be performed according to the methods described herein. In some examples, aspects of the operations of 1110 may be performed by a priority levels determining component as described with reference to FIGS. 6 through 9.

At 1115, the UE may determine resource selection priority levels associated with available resources for sidelink signaling in an unlicensed radio frequency spectrum band, the resource selection priority levels may be determined based on the resource reservation information of the available resources, a time domain location of the available resources, or both, where the first resource is associated with the higher priority based on the slot being unreserved. The operations of 1115 may be performed according to the methods described herein. In some examples, aspects of the operations of 1115 may be performed by a priority levels determining component as described with reference to FIGS. 6 through 9.

At 1120, the UE may select one or more resources for the sidelink signaling from the available resources based on the resource selection priority levels associated with the available resources. The operations of 1120 may be performed according to the methods described herein. In some examples, aspects of the operations of 1120 may be performed by a resource selection component as described with reference to FIGS. 6 through 9.

At 1125, the UE may transmit the sidelink signaling on the unlicensed radio frequency spectrum band using the one or more selected resources. The operations of 1125 may be performed according to the methods described herein. In some examples, aspects of the operations of 1125 may be performed by a sidelink communications component as described with reference to FIGS. 6 through 9.

Figure 12:
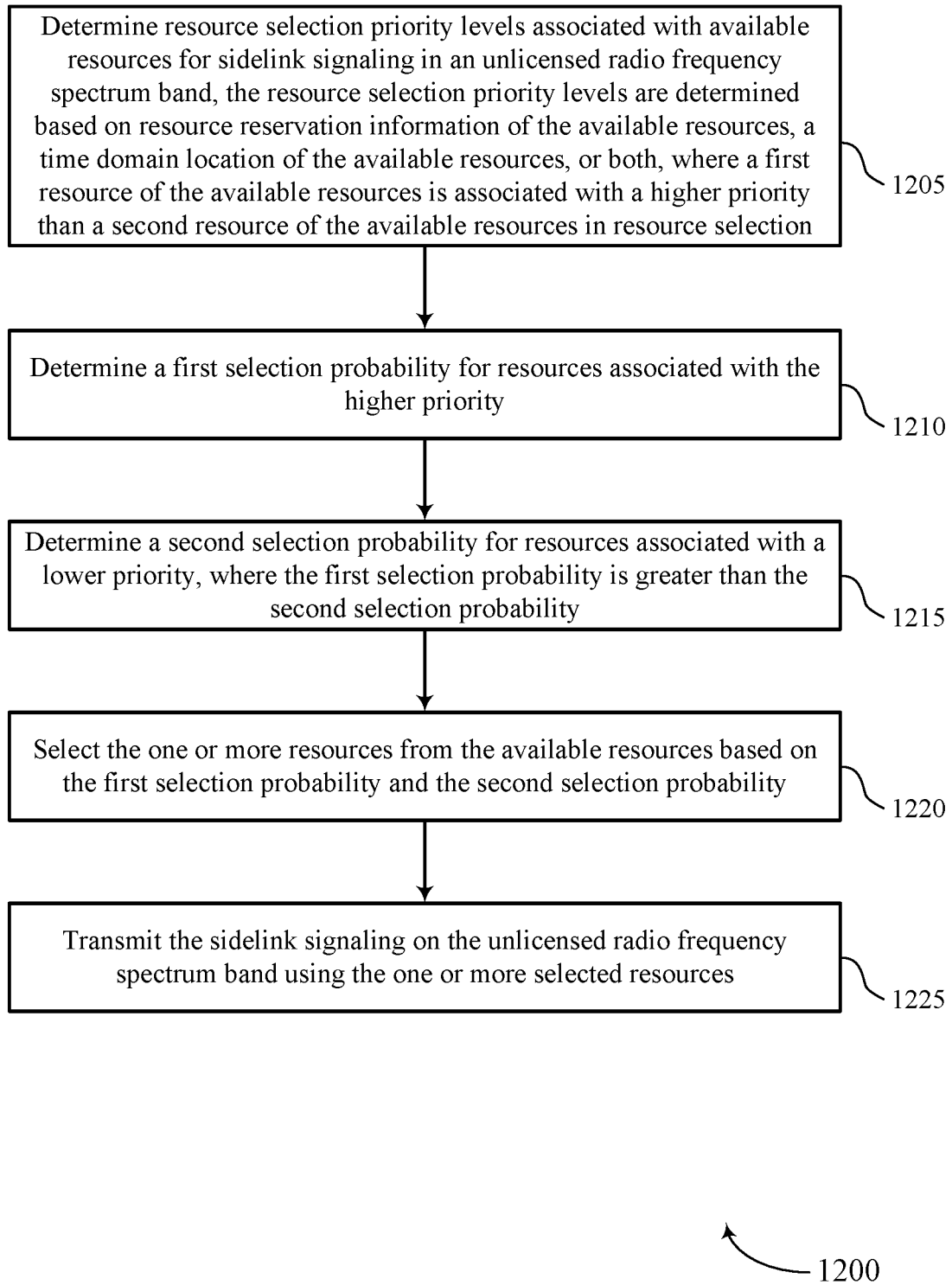

FIG. 12 shows a flowchart illustrating a method 1200 that supports techniques for resource selection for sidelink communication in unlicensed radio frequency spectrum band in accordance with aspects of the present disclosure. The operations of method 1200 may be implemented by a UE 115 or its components as described herein. For example, the operations of method 1200 may be performed by a communications manager as described with reference to FIGS. 6 through 9. In some examples, a UE may execute a set of instructions to control the functional elements of the UE to perform the functions described below. Additionally, or alternatively, a UE may perform aspects of the functions described below using special-purpose hardware.

At 1205, the UE may determine resource selection priority levels associated with available resources for sidelink signaling in an unlicensed radio frequency spectrum band, the resource selection priority levels may be determined based on resource reservation information of the available resources, a time domain location of the available resources, or both, where a first resource of the available resources is associated with a higher priority than a second resource of the available resources in resource selection. The operations of 1205 may be performed according to the methods described herein. In some examples, aspects of the operations of 1205 may be performed by a priority levels determining component as described with reference to FIGS. 6 through 9.

At 1210, the UE may determine a first selection probability for resources associated with the higher priority. The operations of 1210 may be performed according to the methods described herein. In some examples, aspects of the operations of 1210 may be performed by a selection probability component as described with reference to FIGS. 6 through 9.

At 1215, the UE may determine a second selection probability for resources associated with a lower priority, where the first selection probability is greater than the second selection probability. The operations of 1215 may be performed according to the methods described herein. In some examples, aspects of the operations of 1215 may be performed by a selection probability component as described with reference to FIGS. 6 through 9.

At 1220, the UE may select the one or more resources from the available resources based on the first selection probability and the second selection probability. The operations of 1220 may be performed according to the methods described herein. In some examples, aspects of the operations of 1220 may be performed by a selection probability component as described with reference to FIGS. 6 through 9.

At 1225, the UE may transmit the sidelink signaling on the unlicensed radio frequency spectrum band using the one or more selected resources. The operations of 1225 may be performed according to the methods described herein. In some examples, aspects of the operations of 1225 may be performed by a sidelink communications component as described with reference to FIGS. 6 through 9.

Figure 13:
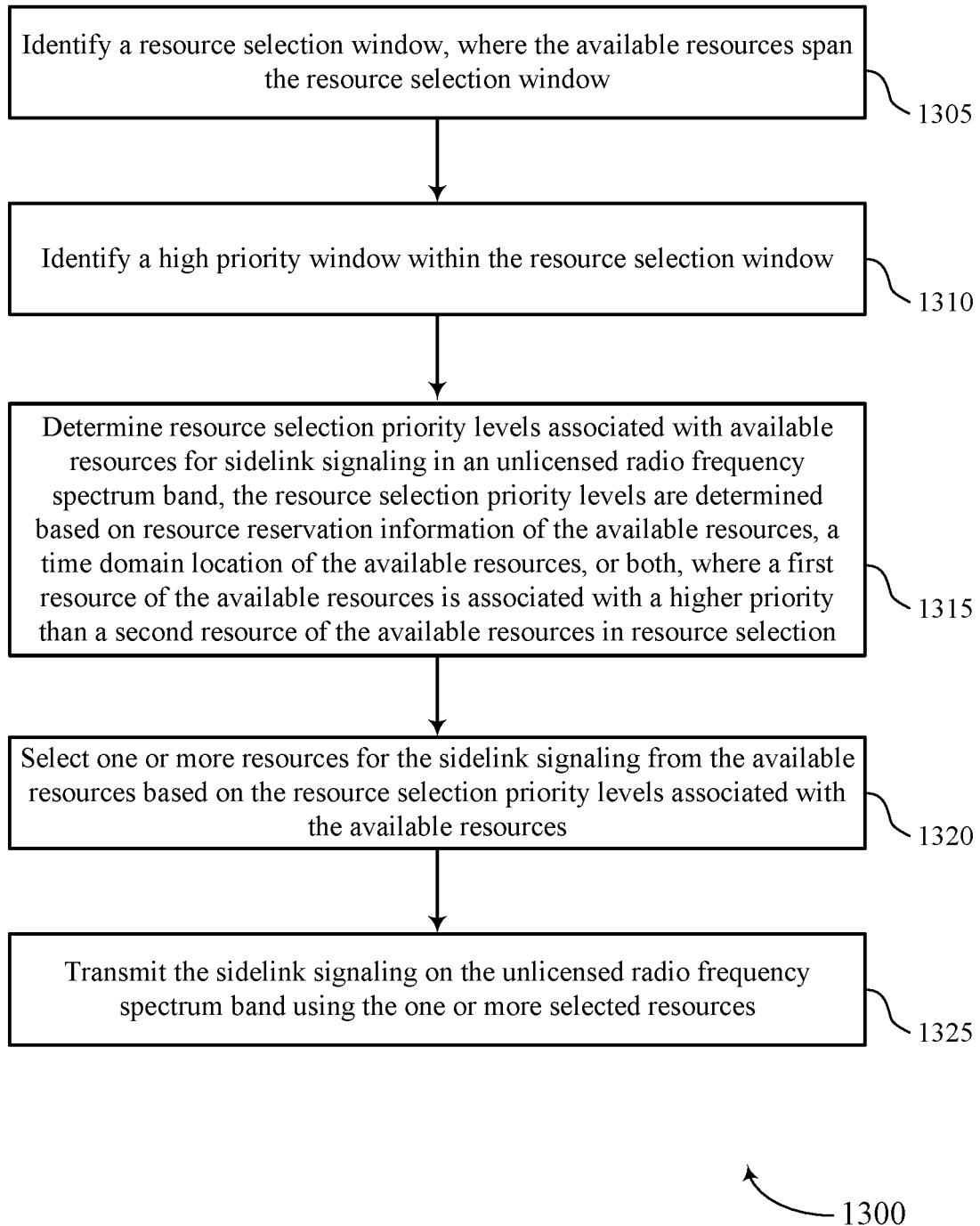

FIG. 13 shows a flowchart illustrating a method 1300 that supports techniques for resource selection for sidelink communication in unlicensed radio frequency spectrum band in accordance with aspects of the present disclosure. The operations of method 1300 may be implemented by a UE 115 or its components as described herein. For example, the operations of method 1300 may be performed by a communications manager as described with reference to FIGS. 6 through 9. In some examples, a UE may execute a set of instructions to control the functional elements of the UE to perform the functions described below. Additionally, or alternatively, a UE may perform aspects of the functions described below using special-purpose hardware.

At 1305, the UE may identify a resource selection window, where the available resources span the resource selection window. The operations of 1305 may be performed according to the methods described herein. In some examples, aspects of the operations of 1305 may be performed by a high priority window component as described with reference to FIGS. 6 through 9.

At 1310, the UE may identify a high priority window within the resource selection window. The operations of 1310 may be performed according to the methods described herein. In some examples, aspects of the operations of 1310 may be performed by a high priority window component as described with reference to FIGS. 6 through 9.

At 1315, the UE may determine resource selection priority levels associated with available resources for sidelink signaling in an unlicensed radio frequency spectrum band, the resource selection priority levels may be determined based on resource reservation information of the available resources, a time domain location of the available resources, or both, where a first resource of the available resources is associated with a higher priority than a second resource of the available resources in resource selection. The operations of 1315 may be performed according to the methods described herein. In some examples, aspects of the operations of 1315 may be performed by a priority levels determining component as described with reference to FIGS. 6 through 9.

At 1320, the UE may select one or more resources for the sidelink signaling from the available resources based on the resource selection priority levels associated with the available resources. The operations of 1320 may be performed according to the methods described herein. In some examples, aspects of the operations of 1320 may be performed by a resource selection component as described with reference to FIGS. 6 through 9.

At 1325, the UE may transmit the sidelink signaling on the unlicensed radio frequency spectrum band using the one or more selected resources. The operations of 1325 may be performed according to the methods described herein. In some examples, aspects of the operations of 1325 may be performed by a sidelink communications component as described with reference to FIGS. 6 through 9.

It should be noted that the methods described herein describe possible examples, and that the operations and the steps may be rearranged or otherwise modified and that other examples are possible. Further, aspects from two or more of the methods may be combined.

The following provides an overview of aspects of the present disclosure:

Aspect 1: A method for wireless communication at a UE, comprising: determining resource selection priority levels associated with available resources for sidelink signaling in an unlicensed radio frequency spectrum band, the resource selection priority levels are determined based at least in part on resource reservation information of the available resources, a time domain location of the available resources, or both, wherein a first resource of the available resources is associated with a higher priority than a second resource of the available resources in resource selection; selecting one or more resources for the sidelink signaling from the available resources based at least in part on the resource selection priority levels associated with the available resources; and transmitting the sidelink signaling on the unlicensed radio frequency spectrum band using the one or more selected resources.

Aspect 2: The method of aspect 1, wherein determining the resource selection priority levels comprises: determining a first slot comprising the first resource is unreserved for communications on the unlicensed radio frequency spectrum band, wherein the first resource is associated with the higher priority based at least in part on the slot being unreserved; and determining a second slot comprising the second resource is at least partially reserved by other devices for communications on the unlicensed radio frequency spectrum band.

Aspect 3: The method of any of aspects 1 through 2, wherein selecting the one or more resources comprises: randomly selecting the one or more resources from resources associated with the higher priority.

Aspect 4: The method of any of aspects 1 through 3, wherein selecting the one or more resources comprises: selecting the one or more resources for the sidelink signaling from the available resources, wherein resources associated with the higher priority have a higher probability of being selected.

Aspect 5: The method of any of aspects 1 through 4, wherein selecting the one or more resources comprises: determining a first selection probability for resources associated with the higher priority; determining a second selection probability for resources associated with a lower priority, wherein the first selection probability is greater than the second selection probability; and selecting the one or more resources from the available resources based at least in part on the first selection probability and the second selection probability.

Aspect 6: The method of any of aspects 1 through 5, wherein determining the resource selection priority levels comprises: identifying a resource selection window, wherein the available resources span the resource selection window; and identifying a high priority window within the resource selection window.

Aspect 7: The method of aspect 6, wherein the high priority window corresponds to earlier resources in the resource selection window.

Aspect 8: The method of any of aspects 6 through 7, wherein selecting the one or more resources comprises: determining a first selection probability for the resources associated with the higher priority in the high priority window; determining a second selection for to resources associated with a lower priority, wherein the first selection probability is greater than the second selection probability; and selecting the one or more resources from the available resources based at least in part on the first selection probability and the second selection probability.

Aspect 9: The method of any of aspects 6 through 8, wherein selecting the one or more resources comprises: selecting the one or more resources from resources in the high priority window.

Aspect 10: The method of aspect 9, wherein the selecting is random.

Aspect 11: The method of any of aspects 6 through 10, wherein the high priority window is based at least in part on a processing speed of the UE.

Aspect 12: The method of any of aspects 6 through 11, further comprising: determining slots comprising resources associated with the higher priority are not reserved by other wireless devices for the unlicensed radio frequency spectrum band.

Aspect 13: The method of any of aspects 1 through 12, further comprising: determining a resource selection window corresponding to the available resources, wherein the resource selection window is determined based at least in part on a channel occupancy time configured by the UE, a base station, another UE, a roadside unit, or any combination thereof.

Aspect 14: The method of any of aspects 1 through 13, wherein the resource selection priority levels comprise at least a first priority level and a second priority level, a resource is associated with the first priority level or the second priority level based at least in part on whether a slot comprising the resource is at least partially reserved by another device, a time location of the resource within a resource selection window, or a combination thereof.

Aspect 15: The method of aspect 14, wherein the resource is associated with the first priority level if the slot comprising the resource is not at least partially reserved by the other device or if the resource is early within the resource selection window, or both.

Aspect 16: The method of any of aspects 14 through 15, wherein the resource is associated with the second priority level if the slot comprising the resource is at least partially reserved by the other device or if the resource is later within the resource selection window, or both.

Aspect 17: The method of any of aspects 1 through 16, wherein the sidelink signaling comprises a sidelink transmission and one or more retransmissions of the sidelink transmission, the one or more resources are selected for the sidelink transmission and the one or more retransmissions of the sidelink transmission.

Aspect 18: The method of aspect 17, wherein a first set resources for the sidelink transmission are selected based at least in part on a high priority window earlier within a resource selection window, and a second set of resources for the one or more retransmissions of the sidelink transmission are selected based at least in part on slots comprising the second set of resources not being at least partially reserved by other wireless devices for the unlicensed radio frequency spectrum band.

Aspect 19: The method of any of aspects 1 through 18, wherein the available resources are within a channel occupancy time configured by a base station, the UE, or another node.

Aspect 20: The method of any of aspects 1 through 19, wherein the available resources span at least a channel occupancy time configured by a base station, the UE, or another node.

Aspect 21: An apparatus for wireless communication at a UE, comprising a processor; memory coupled with the processor; and instructions stored in the memory and executable by the processor to cause the apparatus to perform a method of any of aspects 1 through 20.

Aspect 22: An apparatus for wireless communication at a UE, comprising at least one means for performing a method of any of aspects 1 through 20.

Aspect 23: A non-transitory computer-readable medium storing code for wireless communication at a UE, the code comprising instructions executable by a processor to perform a method of any of aspects 1 through 20.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:

identifying a resource selection window comprising available resources for sidelink signaling in an unlicensed radio frequency spectrum band, wherein the available resources span the resource selection window;

determining resource selection priority levels associated with the available resources, the resource selection priority levels based at least in part on resource reservation information of the available resources and a time domain location of the available resources, wherein a first resource of the available resources within a high priority window earlier in the resource selection window is associated with a higher priority for resource selection than a second resource of the available resources that is later in the resource selection window;

selecting one or more resources for the sidelink signaling from the available resources based at least in part on the resource selection priority levels associated with the available resources; and transmitting the sidelink signaling on the unlicensed radio frequency spectrum band using the one or more selected resources.

2. The method of claim 1, wherein determining the resource selection priority levels comprises:

determining a first slot comprising the first resource is unreserved for communications on the unlicensed radio frequency spectrum band, wherein the first resource is associated with the higher priority based at least in part on the first slot being unreserved; and determining a second slot comprising the second resource is at least partially reserved by other devices for communications on the unlicensed radio frequency spectrum band.

3. The method of claim 1, wherein selecting the one or more resources comprises:

randomly selecting the one or more resources from resources associated with the higher priority.

4. The method of claim 1, wherein selecting the one or more resources comprises:

selecting the one or more resources for the sidelink signaling from the available resources, wherein resources associated with the higher priority have a higher probability of being selected.

5. The method of claim 1, wherein selecting the one or more resources comprises:

determining a first selection probability for resources associated with the higher priority;

determining a second selection probability for resources associated with a lower priority, wherein the first selection probability is greater than the second selection probability; and selecting the one or more resources from the available resources based at least in part on the first selection probability and the second selection probability.

6. The method of claim 1, wherein selecting the one or more resources comprises:

determining a first selection probability for resources associated with the higher priority in the high priority window;

determining a second selection probability for resources associated with a lower priority, wherein the first selection probability is greater than the second selection probability; and selecting the one or more resources from the available resources based at least in part on the first selection probability and the second selection probability.

7. The method of claim 1, wherein selecting the one or more resources comprises:

selecting the one or more resources from resources in the high priority window.

8. The method of claim 7, wherein the selecting is random.

9. The method of claim 1, wherein the high priority window is based at least in part on a processing speed of the UE.

10. The method of claim 1, further comprising:
determining slots comprising resources associated with the higher priority are not reserved by other wireless devices for the unlicensed radio frequency spectrum band.

11. The method of claim 1, further comprising:
determining the resource selection window corresponding to the available resources, wherein the resource selection window is determined based at least in part on a channel occupancy time configured by the UE, a base station, another UE, a roadside unit, or any combination thereof.

12. The method of claim 1, wherein the resource selection priority levels comprise at least a first priority level and a second priority level, wherein a resource is associated with the first priority level or the second priority level based at least in part on whether a slot comprising the resource is at least partially reserved by another device, a time location of the resource within the resource selection window, or a combination thereof.

13. The method of claim 12, wherein the resource is associated with the first priority level if the slot comprising the resource is not at least partially reserved by the other device or if the resource is early within the resource selection window, or both.

14. The method of claim 12, wherein the resource is associated with the second priority level if the slot comprising the resource is at least partially reserved by the other device or if the resource is later within the resource selection window, or both.

15. The method of claim 1, wherein the sidelink signaling comprises a sidelink transmission and one or more retransmissions of the sidelink transmission, wherein the one or more resources are selected for the sidelink transmission and the one or more retransmissions of the sidelink transmission.

16. The method of claim 15, wherein a first set resources for the sidelink transmission are selected based at least in part on the high priority window earlier within the resource selection window, and a second set of resources for the one or more retransmissions of the sidelink transmission are selected based at least in part on slots comprising the second set of resources not being at least partially reserved by other wireless devices for the unlicensed radio frequency spectrum band.

17. The method of claim 1, wherein the available resources are within a channel occupancy time configured by a base station, the UE, or another node.

18. The method of claim 1, wherein the available resources span at least a channel occupancy time configured by a base station, the UE, or another node.

19. An apparatus for wireless communication at a user equipment (UE), comprising:
at least one processor,
at least one memory coupled with the at least one processor; and
instructions stored in the at least one memory and executable by the at least one processor to cause the apparatus to:
identify a resource selection window comprising available resources for sidelink signaling in an unlicensed radio frequency spectrum band, wherein the available resources span the resource selection window;
determine resource selection priority levels associated with the available resources, the resource selection priority levels are determined based at least in part on resource reservation information of the available resources and a time domain location of the available resources, wherein a first resource of the available resources within a high priority window earlier in the resource selection window is associated with a higher priority for resource selection than a second resource of the available resources that is later in the resource selection window;
select one or more resources for the sidelink signaling from the available resources based at least in part on the resource selection priority levels associated with the available resources; and
transmit the sidelink signaling on the unlicensed radio frequency spectrum band using the one or more selected resources.

20. The apparatus of claim 19, wherein the instructions to determine the resource selection priority levels are executable by the at least one processor to cause the apparatus to:
determine a first slot comprising the first resource is unreserved for communications on the unlicensed radio frequency spectrum band, wherein the first resource is associated with the higher priority based at least in part on the first slot being unreserved; and
determine a second slot comprising the second resource is at least partially reserved by other devices for communications on the unlicensed radio frequency spectrum band.

21. The apparatus of claim 19, wherein the instructions to select the one or more resources are executable by the at least one processor to cause the apparatus to:
randomly select the one or more resources from resources associated with the higher priority.

22. The apparatus of claim 19, wherein the instructions to select the one or more resources are executable by the at least one processor to cause the apparatus to:
select the one or more resources for the sidelink signaling from the available resources, wherein resources associated with the higher priority have a higher probability of being selected.

23. The apparatus of claim 19, wherein the instructions to select the one or more resources are executable by the at least one processor to cause the apparatus to:
determine a first selection probability for resources associated with the higher priority;
determine a second selection probability for resources associated with a lower priority, wherein the first selection probability is greater than the second selection probability; and
select the one or more resources from the available resources based at least in part on the first selection probability and the second selection probability.

24. The apparatus of claim 19, wherein the instructions to select the one or more resources are executable by the at least one processor to cause the apparatus to:
determine a first selection probability for resources associated with the higher priority in the high priority window;
determine a second selection probability for resources associated with a lower priority, wherein the first selection probability is greater than the second selection probability; and select the one or more resources from the available resources based at least in part on the first selection probability and the second selection probability.

25. An apparatus for wireless communication at a user equipment (UE), comprising:
- means for identifying a resource selection window comprising available resources for sidelink signaling in an unlicensed radio frequency spectrum band, wherein the available resources span the resource selection window;
- means for determining resource selection priority levels associated with the available resources, the resource selection priority levels based at least in part on resource reservation information of the available resources and a time domain location of the available resources, wherein a first resource of the available resources within a high priority window earlier in the resource selection window is associated with a higher priority for resource selection than a second resource of the available resources that is later in the resource selection window;
- means for selecting one or more resources for the sidelink signaling from the available resources based at least in part on the resource selection priority levels associated with the available resources; and
- means for transmitting the sidelink signaling on the unlicensed radio frequency spectrum band using the one or more selected resources.

26. A non-transitory computer-readable medium storing code for wireless communication at a user equipment (UE), the code comprising instructions executable by a processor to:
- identify a resource selection window comprising available resources for sidelink signaling in an unlicensed radio frequency spectrum band, wherein the available resources span the resource selection window;
- determine resource selection priority levels associated with the available resources, the resource selection priority levels based at least in part on resource reservation information of the available resources and a time domain location of the available resources, wherein a first resource of the available resources within a high priority window earlier in the resource selection window is associated with a higher priority for resource selection than a second resource of the available resources that is later in the resource selection window;
- select one or more resources for the sidelink signaling from the available resources based at least in part on the resource selection priority levels associated with the available resources; and
- transmit the sidelink signaling on the unlicensed radio frequency spectrum band using the one or more selected resources.

* * * * *